US010659660B2

(12) United States Patent
Noffke et al.

(10) Patent No.: US 10,659,660 B2
(45) Date of Patent: *May 19, 2020

(54) DETERMINATION OF TONE VALUE INCREASE FROM A PRINTED IMAGE

(71) Applicant: BALDWIN AMERICAS CORPORATION, St. Louis, MO (US)

(72) Inventors: Patrick Noffke, Hartland, WI (US); John Seymour, Milwaukee, WI (US); Michael Sisco, Waukesha, WI (US)

(73) Assignee: BALDWIN AMERICAS CORPORATION, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/231,144

(22) Filed: Dec. 21, 2018

(65) Prior Publication Data
US 2019/0253583 A1    Aug. 15, 2019

Related U.S. Application Data

(63) Continuation of application No. 15/424,373, filed on Feb. 3, 2017, now Pat. No. 10,187,552, which is a
(Continued)

(51) Int. Cl.
*H04N 1/60* (2006.01)
*H04N 1/64* (2006.01)
(Continued)

(52) U.S. Cl.
CPC ....... *H04N 1/6027* (2013.01); *G06K 9/00442* (2013.01); *G06K 9/4652* (2013.01);
(Continued)

(58) Field of Classification Search
CPC combination set(s) only.
See application file for complete search history.

(56) References Cited

U.S. PATENT DOCUMENTS 5,967,050 A    10/1999  Seymour
7,017,492 B2    3/2006  Seymour
(Continued)

FOREIGN PATENT DOCUMENTS

EP    2 424 217 A2    2/2012
EP    2 651 112 A1    10/2013

OTHER PUBLICATIONS

Corrected Notice of Allowance for U.S. Appl. No. 15/424,373 dated Dec. 21, 2018.
(Continued)

*Primary Examiner* — Helen Zong
(74) *Attorney, Agent, or Firm* — Foley & Lardner LLP

(57) ABSTRACT

Systems and methods for analyzing printed images are provided. One system includes a processing circuit configured to: determine a set of one or more locations on the printed image on the substrate to measure color values; determine a set of input tone values for the at least one ink; receive a set of measured color values corresponding to the set of locations on the printed image from a sensor; and determine a tone value increase error based on the set of measured color values and the set of input tone values. The at least one processing circuit is configured to determine the tone value increase error without requiring measured color values from an area having solid ink.

20 Claims, 12 Drawing Sheets

Related U.S. Application Data continuation of application No. 14/710,414, filed on May 12, 2015, now Pat. No. 9,565,339.

(51) Int. Cl.
  *H04N 1/00* (2006.01)
  *G06K 9/00* (2006.01)
  *G06K 9/46* (2006.01)

(52) U.S. Cl.
  CPC ..... *H04N 1/00023* (2013.01); *H04N 1/00039* (2013.01); *H04N 1/603* (2013.01); *H04N 1/6008* (2013.01); *H04N 1/6058* (2013.01); *H04N 1/646* (2013.01); *H04N 2201/0082* (2013.01)

(56) References Cited

U.S. PATENT DOCUMENTS

| | | |
|---|---|---|
| 7,707,002 B2 | 4/2010 | Fejfar et al. |
| 8,605,268 B2 | 12/2013 | Wu et al. |
| 8,873,104 B2 | 10/2014 | Nachlieli et al. |
| 2005/0093923 A1 | 5/2005 | Busch et al. |
| 2007/0051161 A1 | 3/2007 | Friedman et al. |
| 2007/0216918 A1 | 9/2007 | Honeck et al. |
| 2010/0110461 A1 | 5/2010 | Hallam |
| 2010/0134846 A1 | 6/2010 | Yan |
| 2013/0258427 A1 | 10/2013 | Ito |
| 2015/0002905 A1 | 1/2015 | Yoshida |

OTHER PUBLICATIONS

Final Office Action for U.S. Appl. No. 15/424,373 dated May 16, 2018. 6 pages.
International Preliminary Report on Patentability for PCT Application PCT/US2016/031847 dated Nov. 14, 2017. 6 pages.
Non-Final Office Action for U.S. Appl. No. 14/710,414 dated Apr. 15, 2016. 17 pages.
Non-Final Office Action for U.S. Appl. No. 15/424,373 dated Oct. 3, 2017. 7 pages.
Notice of Allowance for U.S. Appl. No. 14/710,414 dated Jan. 9, 2017. 3 pages.
Notice of Allowance for U.S. Appl. No. 14/710,414 dated Sep. 21, 2016. 9 pages.
Notice of Allowance for U.S. Appl. No. 15/424,373 dated Aug. 31, 2018.
PCT International Search Report and Written Opinion for PCT Application No. PCT/US2016/031847. 8 pages.
European Search Report for EP Application No. 16793448.8 dated Nov. 23, 2018. 10 pages.

DETERMINATION OF TONE VALUE INCREASE FROM A PRINTED IMAGE

RELATED APPLICATION DATA

The present application is a continuation of U.S. patent application Ser. No. 15/424,373 filed Feb. 3, 2017, which is a continuation of U.S. patent application Ser. No. 14/710,414 filed May 12, 2015 (now U.S. Pat. No. 9,565,339). Both of these applications are incorporated by reference herein in their entireties.

BACKGROUND

The present disclosure relates generally to the field of printing. More specifically, the disclosure relates to systems and methods for determining a Tone Value Increase and/or error in Tone Value Increase associated with a printing device and/or portion of a printing process.

Printing images that meet specific color characteristics is an important need for those looking to deliver their messages in print form. To understand how the images can be perceived, "Image" or "Images" can be interpreted to mean a set of values that represent one or more attributes of an area either printed or to be printed. It is these attributes that affect the way print is perceived.

Images may be printed on any Substrate. "Substrate" as used here can be any material that can be printed upon. Commonly this is paper or other cellulose-based material, film or plastic, but it may include any material that be printed upon, whether opaque, translucent or transparent. Printing may be accomplished by combining one or more sets of inks (for example cyan, magenta, yellow, and black) on a Substrate to create a variety of colors.

SUMMARY

One embodiment relates to a system for analyzing reproduction of a printed image on a substrate printed using a plurality of inks. The system includes at least one processing circuit configured to determine a set of one or more locations on the printed image on the substrate to measure color values. The at least one processing circuit is further configured to determine a set of input tone values for the at least one ink. The at least one processing circuit is further configured to receive a set of measured color values corresponding to the set of locations on the printed image from a sensor. In various embodiments: (1) the sensor is configured to generate the measurement values to be compliant with a standard spectral response; (2) the sensor is configured to generate the measurement values based on data measured using at least four wavelength channels; and/or (3) the at least one processing circuit is configured to process the set of measurement values to generate a set of processed values in a standardized color space based on the set of measurement values. The at least one processing circuit is further configured to determine a tone value increase error based on the set of measurement/processed values and the set of input tone values. The at least one processing circuit is configured to determine the tone value increase error without requiring measured color values from an area having solid ink.

Another embodiment relates to a method of analyzing reproduction of a printed image on a substrate printed using a plurality of inks. The method includes determining a set of one or more locations on the printed image on the substrate to measure color values. The method further includes determining a set of input tone values for the at least one ink. The method further includes receiving a set of measured color values corresponding to the set of locations on the printed image from a sensor. In various embodiments: (1) the sensor is configured to generate the measurement values to be compliant with a standard spectral response; (2) the sensor is configured to generate the measurement values based on data measured using at least four wavelength channels; and/or (3) the method further includes processing the set of measurement values to generate a set of processed values in a standardized color space based on the set of measurement values. The method further includes determining a tone value increase error based on the set of measurement/processed values and the set of input tone values without requiring measured color values from an area having solid ink.

Another embodiment relates to a printing system including at least one ink control device configured to control deposition of at least one ink on a substrate to generate a printed image. The printing system further includes at least one processing circuit configured to determine a set of one or more locations on the printed image on the substrate to measure color values and determine a set of input tone values for the at least one ink. The at least one processing circuit is further configured to receive a set of measured color values corresponding to the set of locations on the printed image from a sensor. In various embodiments: (1) the sensor is configured to generate the measurement values to be compliant with a standard spectral response; (2) the sensor is configured to generate the measurement values based on data measured using at least four wavelength channels; and/or (3) the at least one processing circuit is configured to process the set of measurement values to generate a set of processed values in a standardized color space based on the set of measurement values. The at least one processing circuit is further configured to determine a tone value increase error based on the set of measurement/processed values and the set of input tone values and control the at least one ink control device based at least in part on the tone value increase error. The at least one processing circuit is configured to determine the tone value increase error without requiring measured color values from an area having solid ink.

Another embodiment relates to one or more computer-readable storage media having instructions stored thereon that, when executed by one or more processors, cause the one or more processors to implement operations including determining a set of one or more locations on the printed image on the substrate to measure color values. The operations further include determining a set of input tone values for the at least one ink. The operations further include receiving a set of measured color values corresponding to the set of locations on the printed image from a sensor. In various embodiments: (1) the sensor is configured to generate the measurement values to be compliant with a standard spectral response; (2) the sensor is configured to generate the measurement values based on data measured using at least four wavelength channels; and/or (3) the operations further include processing the set of measurement values to generate a set of processed values in a standardized color space based on the set of measurement values. The operations further include determining a tone value increase error based on the set of measurement/processed values and the set of input tone values without requiring measured color values from an area having solid ink.

DETAILED DESCRIPTION

The present disclosure relates to systems and methods for monitoring a reproduction of Halftones within one or more areas of a printed Image. In some embodiments, this information may be used to control color and/or detect defects on a printing system.

Figure 1:
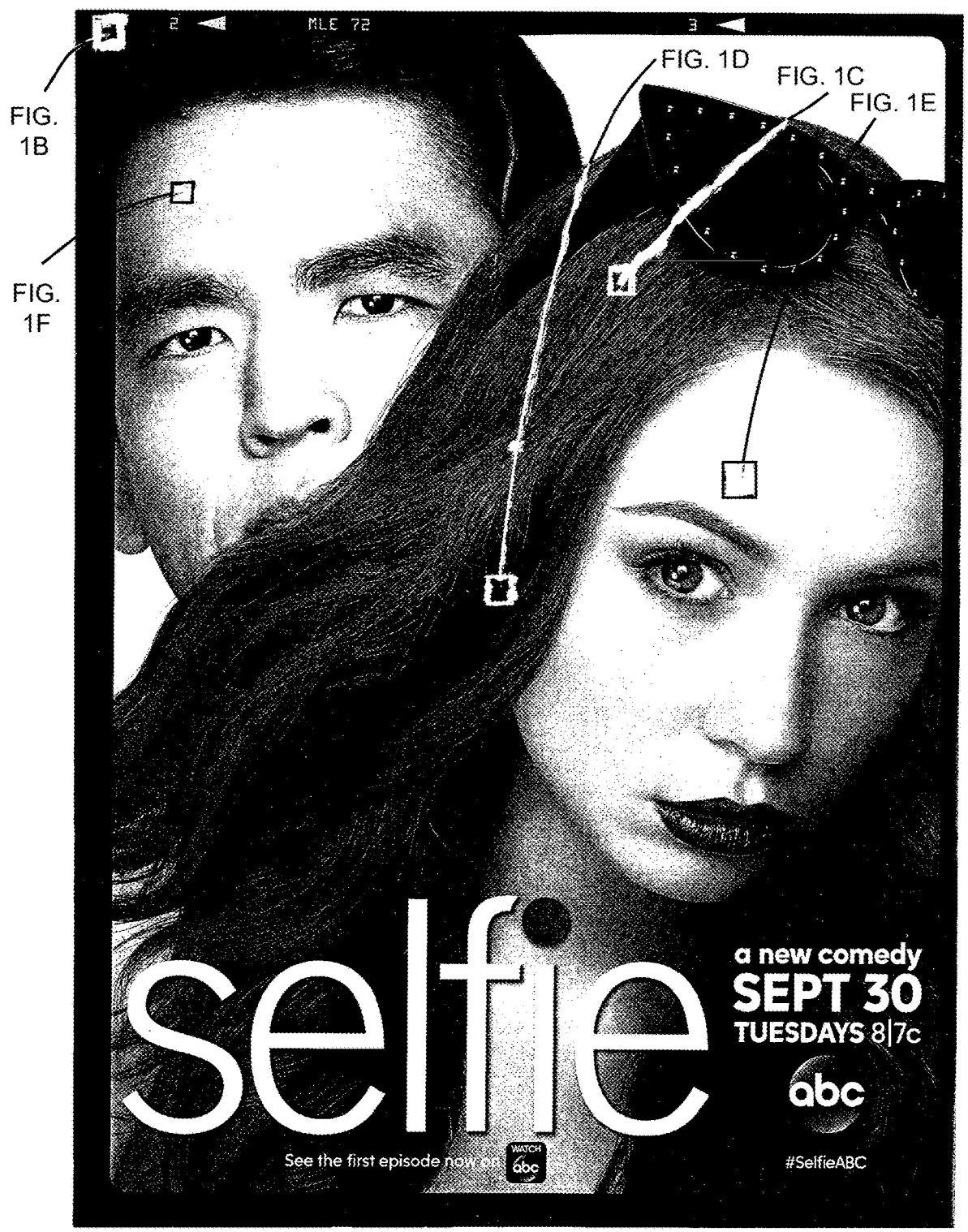
FIG. 1 is an image deposited on a Substrate according to an exemplary embodiment.

In many printing applications, the relevant inks are applied to the Substrate as ink dots. These ink dots may be referred to as "Halftone Dots" or "Halftones." FIG. 1 illustrates an example image printed on a Substrate. The image illustrated in FIG. 1 includes various areas that may be generated using different areas of applied inks. These areas are described below in accordance with exemplary embodiments.

Figure 1B:
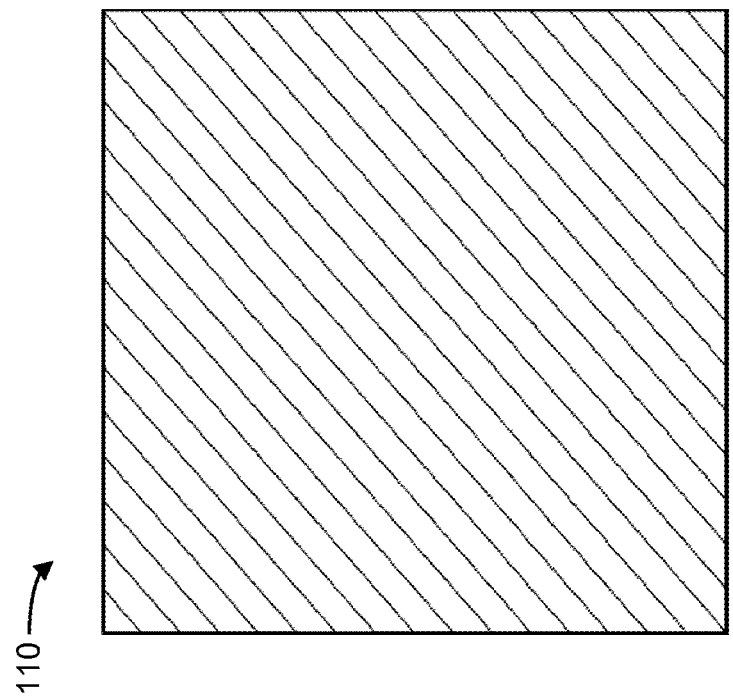
FIG. 1B is an image showing Solid Ink Coverage according to an exemplary embodiment.
Figure 1A:
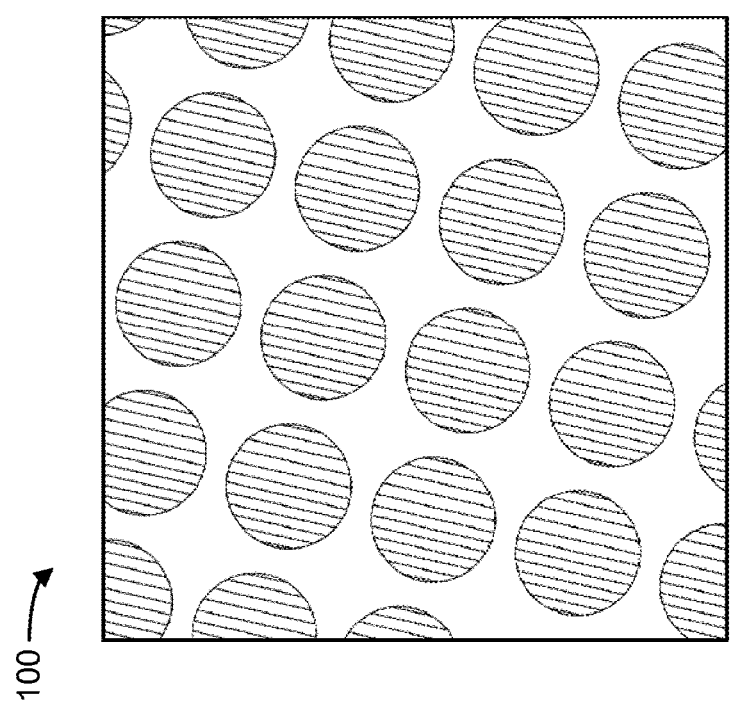
FIG. 1A is an image showing Halftone Dots deposited on a Substrate according to an exemplary embodiment.
Figure 1D:
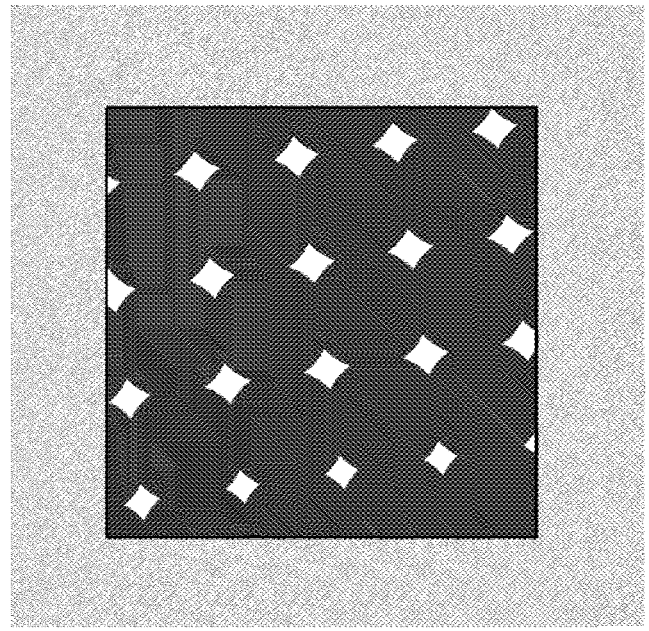
FIG. 1D is an image illustrating a Shadow Tone according to an exemplary embodiment.
Figure 1C:
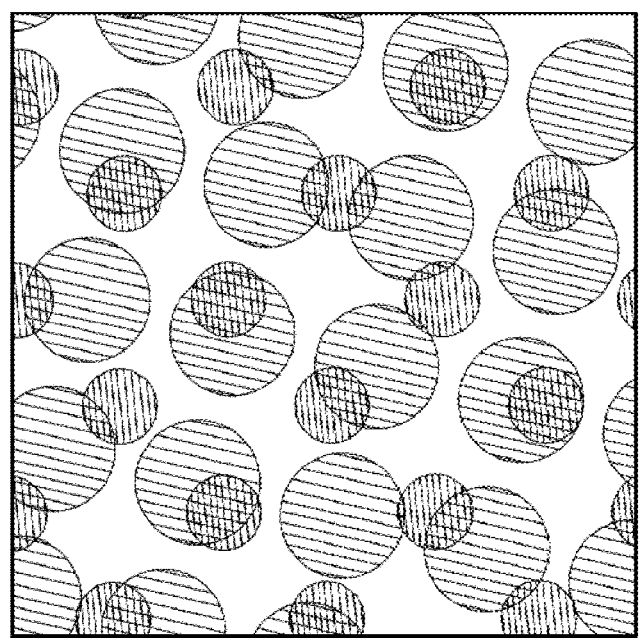
FIG. 1C is an image showing overprinted Halftone Dots according to an exemplary embodiment.

FIG. 1A illustrates an example image 100 showing Halftone Dots deposited on a Substrate according to one illustrative implementation. Printing of Halftones of inks in a manner that creates an area having no gaps between Halftones is referred to as "Solid Ink Coverage" or "Solid Ink." FIG. 1B illustrates an example image 110 showing Solid Ink Coverage, according to one illustrative implementation. The size and/or spacing of the Halftones dots can be modulated to provide gradations of color when the Halftones are collectively viewed on the Substrate from a distance. Overprinting of one Halftone Dot over another of the same or a differently colored ink is a technique used to produce all colors within the entire gamut. FIG. 1C provides an example image 120 of overprinted Halftone Dots according to an illustrative implementation, with one type (e.g., color and size) of Halftone Dot illustrated with hash marks in one direction, and another type (e.g., color and size) of Halftone Dot illustrated with hash marks in another direction.

To ensure that Images are being printed on a Substrate as desired, attributes that may be considered, monitored, measured and/or controlled include Tone Value and Color Value. As applied here, "Tone Value" may refer to a value on a scale ranging from a value representing a pure, unprinted Substrate (e.g., pure paper) to a predefined target richness value for a particular ink.

In some embodiments, the result of printing may not result in distinct Halftone Dots as shown in FIGS. 1B and 1C. For example, while the cylinder used for rotogravure printing has distinct halftone dots, the printing ink often has a very low viscosity, which allows the ink to spread widely between dots, so as to obscure the original halftone structure. In another example, the richness of the halftone is modulated by the distance between Halftone Dots. This Halftone Dot structure is termed "FM screening," or stochastic. In this case, the Halftone Dots are normally quite tiny (~10 microns) and with ill-defined edges so that the area of each dot and likewise the area of coverage in a given area is also ill-defined. In another example, certain digital files which are to be printed may lack any semblance of halftone dots, and use numbers which may range from 0 to 100 or from 0 to 255 to represent the gradations of color. In these cases, the term "Tone Value" may be used to designate the effective relative area of ink applied within an area. For the purposes of this disclosure, it will be assumed that the Tone Value ranges from 0 to 100%, although it is readily seen that the invention described herein is not limited to this range.

Figure 1F:
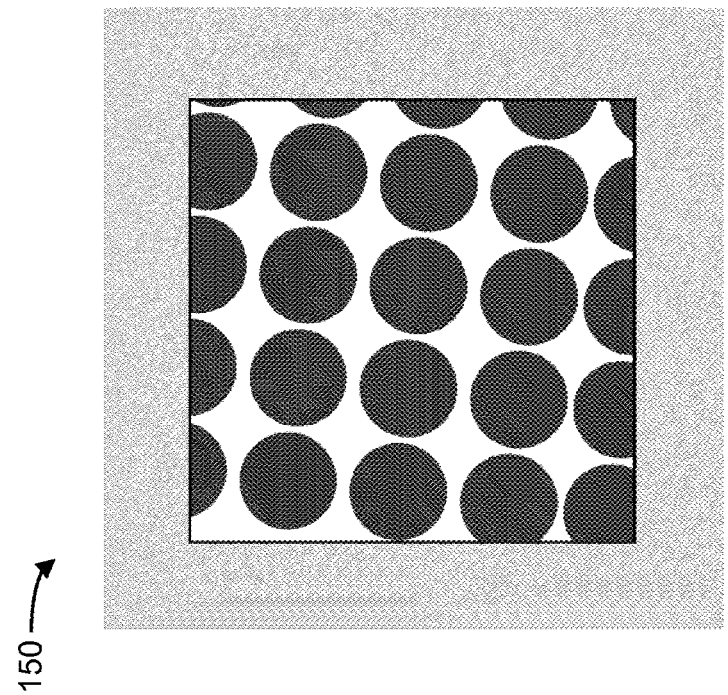
FIG. 1F is an image illustrating a Midtone according to an exemplary embodiment.
Figure 1E:
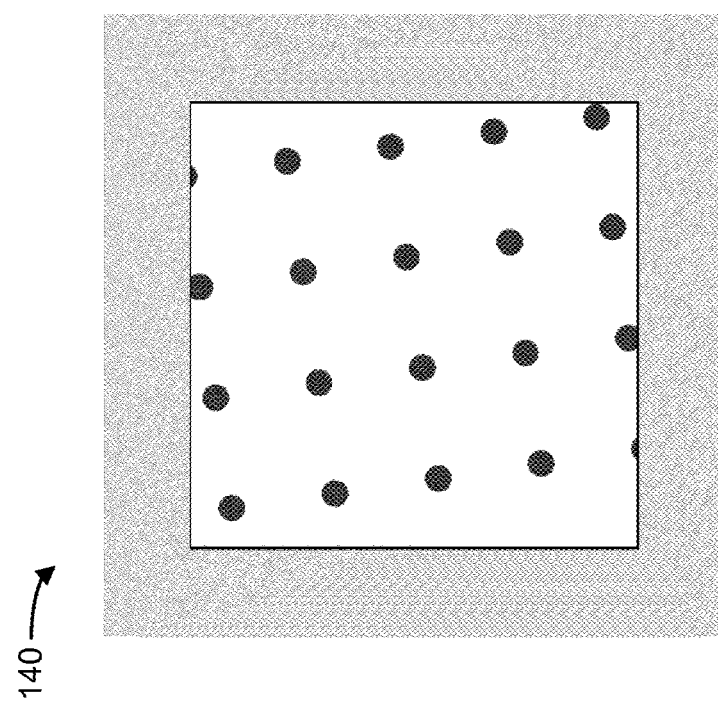
FIG. 1E is an image illustrating a Highlight according to an exemplary embodiment.

As noted above, in some embodiments, Tone Value may be represented as a point on a scale between unprinted Substrate/no ink and a predefined target richness or strength value (e.g., maximum richness/strength) for a given ink (e.g., representing Solid Ink Coverage on an area of the Substrate), often expressed as a percentage. For example, in some embodiments, 100% Tone Value can be used to represent Solid Ink Coverage, a 50% Tone Value can be used to represent 50% Halftones and 50% Substrate, while 0% Tone Value can be used to represent no ink on the Substrate. It is common to refer to Halftones that are near Solid Ink (i.e., 100% Tone Value) as "Shadow Tones," while Halftones near no ink (i.e., 0% Tone Value) are commonly referred to as "Highlights." The Tone Values between the Highlights and Shadow Tones may be referred to as "Midtones." FIGS. 1D, 1E, and 1F show examples of images 130, 140, and 150 as being Shadow Tones, Highlights, and Midtones, respectively, according to illustrative embodiments. The dark portions of images 130, 140, and 150 represent areas on which ink is deposited, and the light portions of images 130, 140, and 150 represent areas of the Substrate on which ink is not deposited. In some embodiments, Tone Value may be represented in various other manners (e.g., as a relative value other than a percentage).

Printers may use Tone Values to determine the initial set-up of the press to deliver the desired Halftone Dot. In one embodiment, the present disclosure provides systems and methods to more accurately determine what Tone Values should be used for initial set-up of a press run (i.e., for providing input parameters to the press in order to print Halftones having an expected Tone Value). The more accurately this can be determined, the more accurately the desired colors may be printed with less time, cost and intervention.

In determining Tone Value for initial set-up, each area of the plate or printed Substrate may be quantified in terms of the Tone Value for each of the inks. As mentioned above, these are often expressed as a value (e.g., ink richness value) on a range from no ink/pure Substrate and a predefined target richness value, so that the Tone Value is a number between 0% and 100%. In some embodiments, the Tone Value may be defined based on a percentage of ink coverage or a percentage of maximum ink transfer. The Tone Values used to set the parameters for ink delivery to the Substrate are called "Input Tone Values." In some printing press implementations, the Input Tone Value is used to create methods to deliver Halftone Dots so as to attain the intended output colors on the printed Substrate. In various implementations, Input Tone Values may be used, for example, in setting press parameters, designing press plates, creating proofs for customer approval, etc.

In print processes employing Halftones, it is generally the case that the amount of ink transferred to the Substrate has a dependence on various conditions of the ink and of the printing press. In addition, the ink forming the Halftone spreads when the ink is applied to the Substrate so that Halftone looks richer in color than one would expect based on the Input Tone Value. A densitometer or spectrophotometer may be used to measure the printed Halftone on the Substrate. Such measurements may be combined with measurements of a solid inked area and of the bare substrate and converted into an "Apparent Tone Value," for example, using the Murray-Davies equation, as is well known in the industry. Variations on the Murray-Davies formula include, for example, those by Yule and Nielsen, by Noffke and Seymour, and by Tom Lianza. This Apparent Tone Value is also a value in a range from no ink/pure Substrate to a predefined target richness/strength value (e.g., a number in the range from 0% to 100%), and is indicative of the apparent strength/richness of the color.

The difference between the Input Tone Value and Apparent Tone Value was historically called "Dot Gain," based on web offset print processes. The same measurement techniques came into use for other printing technologies, particularly technologies that did not have as distinct of a dot structure. Since the term "Dot Gain" was a misnomer for some printing technologies, this term was deprecated in favor of the more general term "Tone Value Increase" or "TVI."

TVI is generally expressed as a percentage, or more accurately, as a difference in percentage points. Thus, if an Input Tone Value is 25%, and the resulting Apparent Tone Value is 32%, then the TVI for that Halftone is 7%—a simple difference, rather than a percentage of change (although, in some embodiments, a percentage of change could be used).

Standards have been developed in order to more precisely align the printed work with the intended appearance. TVI is one of the parameters that are defined under the standards. Thus, the international standard ISO 12647-2 and ISO 12647-3 provide Target TVI values for different printing conditions. Alternately, Target TVI values may be provided through quasi-standards that are embedded in ICC profiles, such as ICC profiles that have target TVI values of 20% or 26%. This means that a 50% Halftone is targeted to print with an Apparent Tone Value of 70% or 76%, respectively.

When a print job is created, it will have a Target TVI associated with it for each of the inks. Such association may be explicitly stipulated by documents included with the image files, or implicitly stipulated by a variety of means, for example, by referencing an ICC profile, or through a contract between the printer and the print buyer. Such a contract may define the Target TVI values, or may reference a standard to define these.

If a printer knows that his printing press will inherently print Halftones with the Target TVI, then the files can be printed directly and will reach the Target TVI. It is more likely, however, that a printing press will have a different inherent TVI. This inherent TVI may vary depending on several factors, including (most prominently) the screen ruling of the print job (that is, the distance between the centers of the halftone dots), the porosity of the Substrate, and the viscosity of the printing ink. The latter two factors are indirectly a factor of environmental factors such as temperature and humidity, so they may vary over time. The inherent TVI of the press is also affected by various abnormal conditions of the press, such as the pressure between rollers, or inappropriate levels of dampening solution. The difference between the Target TVI and this actual inherent TVI associated with the press may be referred to as "TVI error."

Thus, it is incumbent upon the printer to control the TVI of a press. This is difficult to control directly, so the most common means for control is compensation when the printing plates are created. The compensation is performed through what is known as a plate curve, which acts as a lookup table to translate from Input Tone Values to Tone Values that are imaged on the printing plate. For example, if it is expected that the press will have a 15% TVI for a 50% Halftone, and if the Target TVI is 20%, then the plate curve will translate a 50% Halftone into a 55% Halftone when the printing plate is created.

Thus, it is incumbent upon the printer to track the TVI for a printing press both as an assurance that the current job is running properly, and over a longer term, to provide feedback to the plate making process.

Color Value is an attribute of an Image that may be considered when printing. This attribute again helps determine how the print is perceived by the intended audience. "Color Value" may include one or more values (e.g., a set of numbers) indicative of a color. Color Value may include, for example, Tone Values for each of a set of inks. The inks may include cyan, magenta, yellow, and black (CMYK) colored inks or may include additional colored inks such as orange, green, and violet (OGV). As another example, a Color Value may be a triplet of numbers, or some modification thereof, corresponding to a position in a standardized color space. Examples of standardized color spaces may include, but are not limited to, Adobe sRGB, CIE XYZ, CIELAB, CIELUV, or DIN99. For the sake of brevity, CIELAB will be referenced throughout the remainder of the present disclosure, but it should be understood that, in various embodiments, any standardized color space may be utilized as an alternative to CIELAB unless otherwise indicated. Spectral data, such as reflectance data at various intervals in the relevant light spectrum (e.g., number values at 10 nm intervals from 400 nm to 700 nm the visible light spectrum), is yet another example of a Color Value. Yet another example of Color Value may include an optical density value.

Figure 1G:
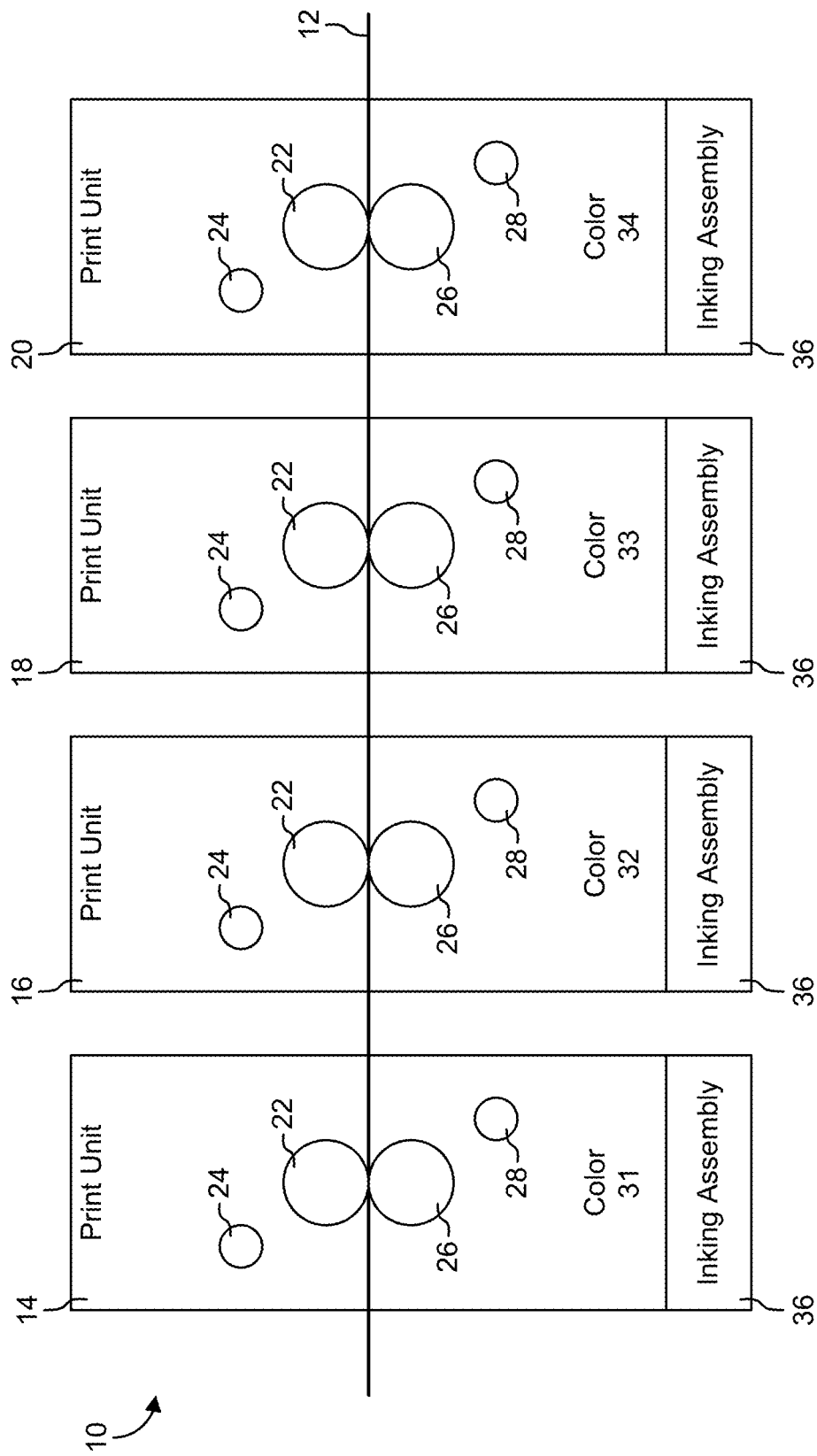
FIG. 1G is a block diagram of a web-offset printing system according to an exemplary embodiment.

One exemplary type of printing system with which the features of the present disclosure may be used is a web-offset printing system. Referring to FIG. 1G, a web-offset printing system 10 for printing a multi-color Image upon a Substrate 12 (e.g., a web or sheet of material, such as paper) is illustrated. In the illustrated embodiment, four printing units 14, 16, 18, and 20 each print one color of the Image upon Substrate 12. Each printing unit 14, 16, 18, 20 includes an upper blanket cylinder 22, an upper printing plate cylinder 24, a lower blanket cylinder 26, and a lower printing plate cylinder 28 to permit printing on both sides of Substrate 12. In printing system 10, colors 31, 32, 33, and 34 on units 14, 16, 18, and 20 respectively, are typically black (K), cyan (C), magenta (M), and yellow (Y). The location of printing units 14, 16, 18, and 20 relative to each other is determined by the printer, and may vary.

Figure 2:
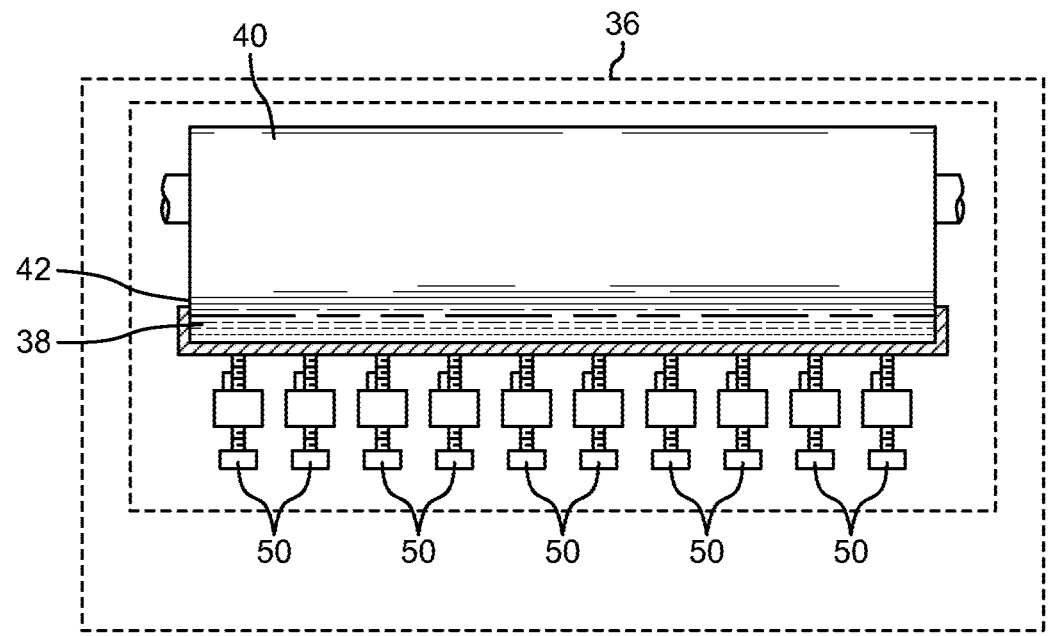
FIG. 2 is an illustration of an inking assembly according to an exemplary embodiment.

Each printing unit 14, 16, 18, and 20 includes an associated inking assembly 36, which is shown in FIG. 2. Inking assembly 36 operates to supply ink to the Substrate 12 in order to print Images, and includes an ink reservoir 38 disposed adjacent an ink fountain roller 40 (also known as the ink ball) that extends laterally across Substrate 12. A blade 42 extends along ink fountain roller 40 and is segmented so that the spacing of each segment relative to ink fountain roller 40 can be independently adjusted. Each blade segment may have an edge that is moved toward and away from the outer surface of the ink fountain roller 40 by adjustment of an associated ink control device or ink key 50.

As shown in FIG. 2, a plurality of the ink keys 50 are disposed at equally-spaced lateral locations along the inking assembly 36 to press against blade segments at those locations to establish and adjust the size of the space between the roller 40 and the blade segment to control the thickness of the ink film provided to the outer surface of the ink fountain roller 40. The number of ink keys will vary with different types of printing presses. One number of ink keys for a 36 inch wide web may be 24, so each ink key controls ink to an ink key zone on the web that is about 1½ inches wide. Certain implementations of a printing unit 14, 16, 18, and 20 may omit the blade 42, and replace it with individual distinct segments which are each part of the individual ink keys 50.

The features and/or characteristics of a web-offset type press utilized in conjunction with the features of the present disclosure may vary according to various exemplary embodiments. The embodiment provided above is provided solely for the purposes of illustration. Additionally, the present disclosure may be utilized in conjunction with other types of printing devices as well, including, but not limited to, lithographic presses, gravure presses, digital presses, and/or inkjet printers.

Many variables can affect the actual color of the printed Image. Two such variables include the inking level and the reproduction of Halftones.

The inking level is largely a function of the amount of pigment that is deposited on the Substrate. This can be modulated in various ways. On a lithographic press, ink keys or pumps may be used to meter the flow of ink onto the printing plate. On a flexographic or gravure press, the pigment concentration may be adjusted in order to modulate the pigment. On an ink jet printer, the volume of ink that is dispersed may be changed.

One method for indirectly measuring the inking level is through the use of optical density. The reflectance of the area on the printed Substrate can be measured within a certain wavelength range by using a spectrophotometer or densitometer. The density is the negative of the logarithm of the reflectance. Measurement of the richness of an ink can also be inferred from the measurement of CIELAB (also known as L*a*b*) values, which is a standard means for measuring color. CIELAB values are typically measured with a colorimeter or spectrophotometer.

The reproduction of Halftones in the printed Image can be affected by a number of variables on a printing device, such as a press (e.g., a web-offset press). One such variable is the extent that dots spread when they reach the Substrate. This can depend upon factors such as the viscosity of the ink, the pressure between rollers, and properties of the Substrate. Another variable that may affect the reproduction of the Halftone is the ink take-up by the printing plate or cylinder. In lithographic printing, this is partially mediated by the balance between ink and fountain solution. In gravure printing, the take-up is mediated by the viscosity and surface tension of the ink and by the accelerating voltage. Another source of variation of the reproduction of Halftones may be the degradation of the printing plate or cylinder.

One method for characterizing the reproduction of Halftones is by the Apparent Tone Value or by the closely related Tone Value Increase. In some embodiments, this may be determined by measuring Tone Values. For example, Apparent Tone Value may be determined by measuring the optical density of the Solid Ink, as described previously, as well as the optical density of the Substrate and of a non-solid ink area or Halftone, whether being a Shadow tone, Midtone, or Highlight. These Tone Values can then be used in the Murray-Davies formula to yield the Apparent Tone Value. Once the Apparent Tone Value is determined, it can be used with the Input Tone Value to determine TVI.

Another method for characterizing reproduction of Halftones is by determining the distance in color space (e.g., a standardized color space) between the Substrate and the Halftone as compared to the distance in color space between the Substrate and the Solid Ink.

One complication in assessing the inking level and the reproduction of Halftones is that they are intertwined. Variations in the amount of pigment transferred to the Substrate will affect the richness of the Solid Inks, but will also affect the reproduction of the Shadow Tones and, to a lesser extent, the reproduction of the Midtones and Highlights. Variations in the viscosity of the ink may effect, in particular, the reproduction of the Midtones.

In order to achieve predictable and stable color of printed Images on press, both the inking level and the reproduction of Halftones may be monitored. Historically, this has been done through measurement of a color bar. Traditional color bars consist of a series of reference patches of uniform color. Typically, the color bar would include patches of each of the Solid Inks, 25%, 50%, and 75% patches of the solids. A Halftone inks, as well as overprints of the solids. A gray patch comprised of Halftones of each of the three inks, cyan, magenta, and yellow may also be included in the color bar.

Press operators often rely on measurements of the patches within the color bar to assess the state of the press. Abnormal measurement values, for example, high TVI, may be an indication of damage to a roller bearing. A decrease in Tone Value may indicate wear to a printing plate.

Measurements from a color bar also may provide the press operator with useful feedback as to the accuracy of the prepress process. If, for example, a given press is consistently showing higher than expected values for Tone Value Increase, it may be decided that an adjustment be made to the production of printing plates so that the press will henceforth print Halftones to provide more accurate color. For example, an adjustment to the Input Tone Value could be made to accommodate the changes in Tone Value being observed on press to eliminate or reduce Tone Value Increase.

There are various strategies to control the color during a press run based on measurements of color bars. In one control strategy, the Solid Inks are measured and control is activated to bring them to within a tolerance of a target value for some Color Value measure such as optical density or CIELAB value. The control mechanism may be based on the inking level, which is to say, adjustment is made of either the volume of ink per area of Substrate, the ink film thickness on the Substrate, or the pigment concentration of the ink.

In another ink control strategy, a Halftone value (typically a Shadow Tone) may be monitored for some measure of Color Value and control is again affected through some mechanism based on the inking level. In another strategy, the Color Value(s) of the Halftone overprint may be measured.

Color bars are, therefore, a useful color management tool, but may be distracting in the final product. For printed work that is trimmed during a binding operation after printing, color bars are often placed in the trim area, often between the printed impressions. In this way the color bars are not part of the shipped product. But, color bars also may be unwelcome in certain types of print, such as "products of press." This refers to printed product such as newspapers and inserts which are shipped directly from the press without being sent to a separate binding operation. Since they are not bound, there is no opportunity for any color bars on such printed product to be removed. As a result, the undesirable color bars will remain on the product delivered to end-consumers.

Another issue with color bars is that they only reflect the operation of the press at one physical location of the printed Substrate. Different physical locations within an Image or on the press may have inherently different inking levels or reproduction of Halftones.

In addition, color patches within the color bar are limited in quantity, so they will likely not include all of those Input Tone Values used in preparing the plates or other image transfer device. This will prevent the ability to measure the Apparent Tone Value at each location and compare those values with the Input Tone Values at each location, to accurately determine Tone Value Increase at each location within the printed Substrate.

So-called "markless" color control systems are known in the art which make measurements of areas of the printed image beyond just the color bar. Live adjustments of the inking levels are actuated based on a comparison between the measured Color Values of the printed work and target values for these measured Color Values. While these systems make it possible to remove the unwelcome color bars from the printed work, the removal of color bars and the measurement thereof deprives the press operators of a useful quality control tool, since there is not a guarantee of an adequate and consistent set of inking combinations such as found in a color bar.

According to some exemplary embodiments, the systems and methods of the present disclosure may be configured to determine Tone Value Increase without relying solely on a color bar, but relying instead on Images printed on the Substrate, alone or in combination with a color bar. In some embodiments, this may allow for determination of TVI in media where color bars are undesirable, such as newspapers, without requiring such media to include color bars. In some embodiments, exemplary systems and methods may use Images printed on the Substrate in combination with data from a color bar to determine TVI.

It is relatively inexpensive to equip a printing press with an RGB (red, green, and blue) camera for viewing the printed Substrate. Such a camera typically uses a set of filters (red, green, and blue) to create a three-channel Image of the printed web. While these cameras are widely available and inexpensive, the downside is that the spectral response of the camera in the red, green, and blue channels is not standardized. Thus, one make and model of camera may have a different response than another, and will not be directly translatable into standardized color measurements.

Further, there are no RGB cameras widely available that match an International Organization of Standardization (ISO) standard spectral response, such as that of ISO Status T density (which is used to measure optical density) or of Commission on Illumination (CIE) tristimulus response (which is used for colorimetric measurements), or that match a de facto standard spectral response such as sRGB or Adobe RGB. Use of RGB cameras requires some calibration in order to translate the camera's version of RGB into a standard response. This calibration is sensitive to characteristics of the ink as well as the spectral reflectance and gloss of the printed Substrate, so systems which use RGB cameras to monitor and/or control color introduce large errors into the color management process.

One solution to the issue of lack of accuracy of RGB cameras is to use a spectrophotometer instead of or in addition to the RGB camera. A spectrophotometer utilizes more than three wavelength channels so as to approximate a standard spectral response. Spectrophotometers typically have between 16 and 36 wavelength channels.

In some embodiments of this invention, color measurements of individual areas are performed with a spectrophotometer. The spectrophotometer is positioned so as to measure single areas in a multiplicity of locations on the printed web and over time collect enough information for the processing.

A spectrophotometer which relies on individual light flashes to collect measurements may be capable of collecting ten samples per second. A spectrophotometer which utilizes a continuous light source might be capable of collecting thousands or tens of thousands of measurements per second. Either system may require a transport mechanism to laterally traverse the moving web so as to enable it to measure arbitrary locations on the web.

In some applications, there may be a requirement for a large number of measurement locations, so that the speed of the transport mechanism combined with the speed that the spectrophotometer can acquire measurements makes this approach prohibitively slow.

Thus, there is an inherent tradeoff between an RGB camera, which can acquire a great deal of measurements at once, but where the measurements may lack the required accuracy, and a spectrophotometer, which can acquire accurate measurements, but only one at a time.

A hyperspectral camera is a spectrophotometer that is capable of collecting measurements of a great number of measurement locations at the same time. For some applications, such a device may prove to better fit the needs of this invention.

However, for some applications, the speed of data collection of a hyperspectral camera may still fall short of the requirements. In particular, if it is desired to make measurements of a twelve inch wide swath of the moving web, with measurement areas which are 0.040 inches by 0.040 inches, at a web speed of 2,500 feet per minute, then the cost of a hyperspectral camera with 31 wavelength channels may be cost prohibitive. For some applications, a practical solution is to utilize an abridged hyperspectral camera. Such a device utilizes fewer than 16, but more than 3 wavelength channels. Such a device may, for example, utilize 6 wavelength channels. Utilizing the additional channels (as compared with an RGB camera) improves the ability of an abridged hyperspectral camera to accurately approximate a standard spectral response. Since an abridged hyperspectral camera functions as a camera, it can collect a large number of measurements in a short amount of time, thus overcoming a limitation of a spectrophotometer.

According to some exemplary embodiments, the systems and methods of the present disclosure may be configured to have a color fidelity greater than that of an RGB camera and hence may quantify the reproduction of Halftones and Tone Value Increase more accurately without relying on a color bar.

Some systems may acquire Image data from the printed Substrate with an RGB camera and then convert this RGB data directly into CMYK data. Discrepancies between this acquired CMYK data and the corresponding target CMYK data derived from prepress files may be used to measure and control inking levels. Analysis of these discrepancies may also be used to infer a quantification of the reproduction of Halftones.

Such an approach is inherently problematic, however, because of the reliance on the RGB to CMYK conversion. This conversion is an attempt to get four uncorrelated quantities out of three measurements. There will always be a difficulty discerning a change in the black ink from a coordinated change in the three inks CMY.

According to some exemplary embodiments, the systems and methods of the present disclosure may be configured to quantify the reproduction of Halftones without relying on a color bar, and without relying on an intermediate transformation to CMYK values.

The present disclosure presents systems and methods that may analyze a reproduction of a printed Image on a Substrate (e.g., analyze a reproduction of Halftones in the printed Image) based on values measured from the Image itself. A system may receive and/or generate a set of Input Tone Values for one or more locations on the Substrate. The system may also receive values for one or more locations on the printed Image from a sensor (e.g., measured or measurement values) and use the values to determine one or more Apparent Tone Values. In some embodiments, the sensor may generate the measured values in compliance with a standard spectral response. In some embodiments, the sensor may additionally or alternatively collect data with respect to at least four wavelength channels (and more preferably six wavelength channels or ranges, and even more preferably twelve, twenty-four or thirty-one wavelength channels or ranges). In some embodiments, the sensor may generate data (e.g., Color Values) in a standardized color space (e.g., XYZ). In some embodiments, the sensor may generate data (e.g., Color Values) that are not in a standardized color space, and the system may process the measurement values to generate values within a standardized color space, such as CIELAB.

The system may generate output data for the ink representing a reproduction of Halftones. In some embodiments, the output data may represent a Tone Value Increase for the ink. In some embodiments, the output data may be generated without using a color bar. In some embodiments, the output data may be utilized to affect improved color control of the printed Substrate. In some embodiments, the output data may represent a Tone Value Increase Error for the ink.

In some embodiments, the output data may be utilized to affect improved detection of defects on the printed Substrate. In particular the output data may be used to ameliorate problems associated with misdiagnosis of color discrepancies due to inking level as opposed to reproduction of Halftones.

Figure 3:
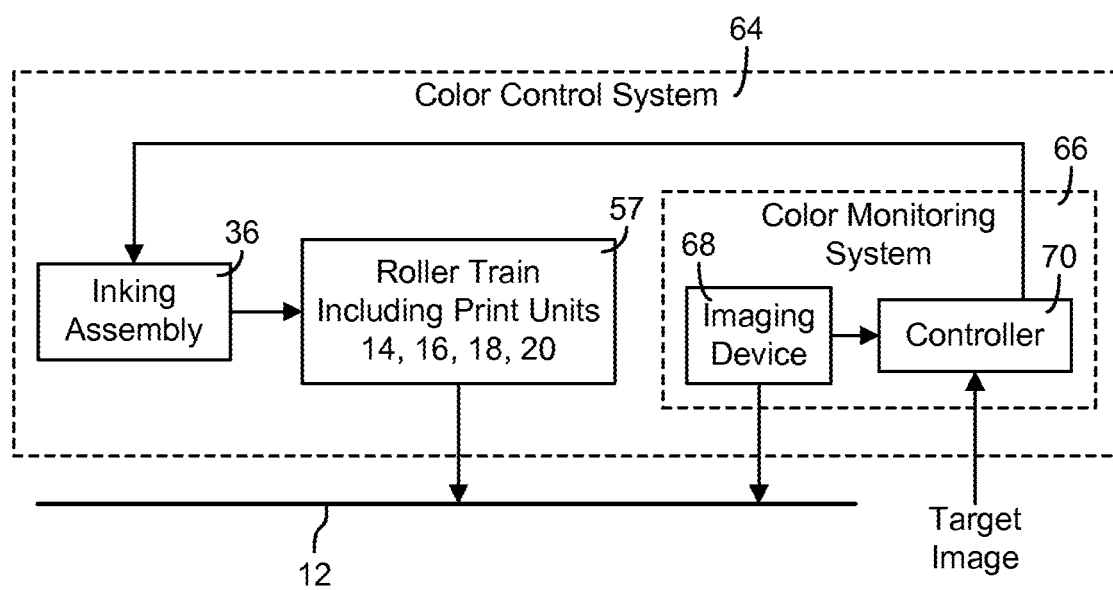
FIG. 3 is a block diagram of a color monitoring and/or control system according to an exemplary embodiment.

FIG. 3 illustrates a block diagram of one possible system for monitoring and/or controlling color of a printed Image on a Substrate according to an exemplary embodiment. Color control system 64 operates to determine the ink key settings of the inking assembly 36 to control the amount of ink fed to printing units 14, 16, 18, 20 and to corresponding ink key zones on Substrate 12. Color control system 64 includes a color monitoring system 66 including a controller 70 and an imaging device 68. Imaging devices may include a video camera, line scan camera, area camera, spectral or hyper spectral imagers, or other types of imaging devices. Imaging device 68 may acquire measurements (e.g., an image) from one or more areas of a printed Substrate 12 over one or more ink key zones. The measurements may be Color Values (e.g., Tone Values), spatial values, and/or other measured values. In some embodiments, controller 70 may utilize measured Color Values directly. In some embodiments, controller 70 may convert the measured Color Values into a different Color Value format, such as a value in a standardized color space. For example, imaging device 68 may generate measurement data representative of RGB or spectral reflectance values, and controller 70 may convert the measured RBG or spectral reflectance values into processed CIELAB values for each area or image pixel within the camera's field of view. The acquired measurements may be used to monitor characteristics of the printed Image and/or press, such as reproduction of Halftones, to control inking assembly 36 and/or print units 14, 16, 18, and/or 20, and/or to detect defects in the printed Image. While FIG. 3 is shown for purposes of illustration, it should be understood that, in other embodiments, the features of the present disclosure may be utilized with printing systems having different features than those illustrated in FIG. 3.

Figure 4:
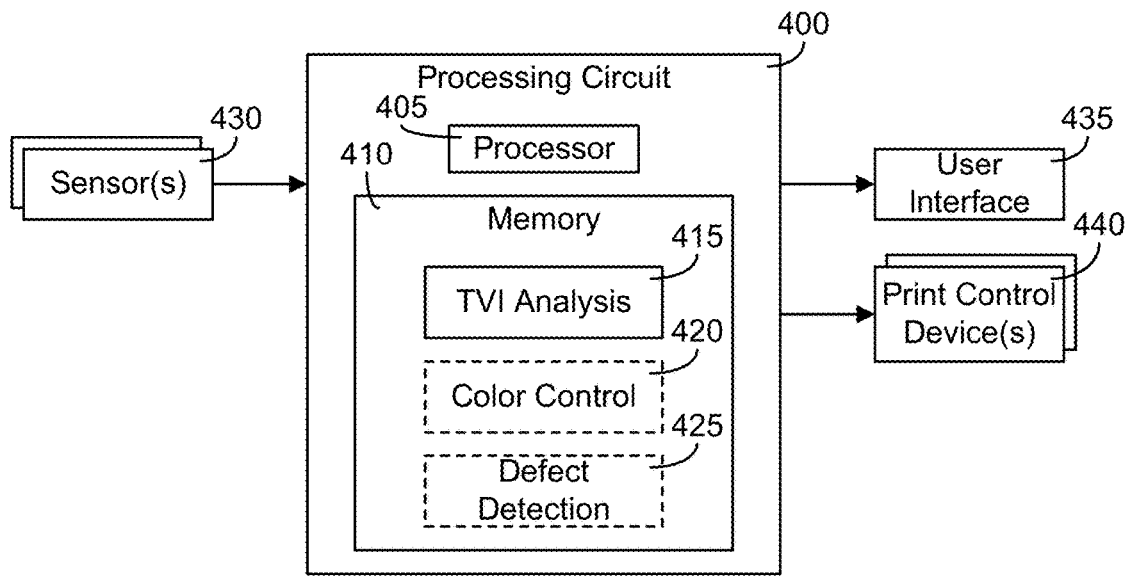
FIG. 4 is a block diagram of a processing circuit configured to monitor a relative area of ink applied within an area (e.g., monitor a change in Tone Value, or a Tone Value Increase) and/or perform color control and/or defect detection according to an exemplary embodiment.

FIG. 4 illustrates a processing circuit 400 configured to monitor Tone Value in at least a portion of the printed Image according to an exemplary embodiment. In some embodiments, processing circuit 400 may additionally or alternatively perform color control and/or defect detection. Processing circuit 400 includes a processor 405, which may be any type of general purpose or special purpose processor (e.g., FPGA, CPLD, ASIC, etc.). Processing circuit 400 also includes a memory 410, which may be any type of computer or machine-readable storage medium (e.g., RAM, ROM, magnetic storage, solid state storage, optical memory, etc.). In one exemplary embodiment, controller 70 of FIG. 3 may be implemented using a processing circuit similar to processing circuit 400.

Memory 410 may include one or more processing modules (e.g., sets of instructions executable by processor 405) configured to perform various tasks or functions of processing circuit 400. For example, memory 410 may include a TVI analysis module 415 configured to generate data representative of a reproduction of Halftones or Tone Value Increase within one or more locations in a printed Image. The Halftone Dots for one ink may be combinable with Halftone Dots for other inks to generate desired colors within particular locations (e.g., ink key zones, pixels, etc.). In some embodiments, memory 410 may include a color control module 420 that may be configured to control (e.g., modify) a color of the printed Image based on the generated data, such as by controlling one or more print control devices 440 (e.g., ink keys). In some embodiments, memory 410 may include a defect detection module 425 configured to detect print defects (e.g., defects relating to problems other than color control) based on the generated data.

Processing circuit 400 may receive input data from one or more sensors 430. Processing circuit 400 may be configured to generate data or other information utilizing or based on the input data. The sensors may be a part of the imaging device or be the imaging device itself. The sensors can be used to receive the Image data and output that data, directly or indirectly, to the processing circuit 400. In some embodiments, processing circuit 400 may output information relating to the generated data to a user interface 435. The user interface 435 may be configured to communicate relevant information to an operator of the printing device, including information based on the output data (e.g., through sight such as on a display device, sound such as through speakers, touch such as through haptic devices, etc.).

Figure 5:
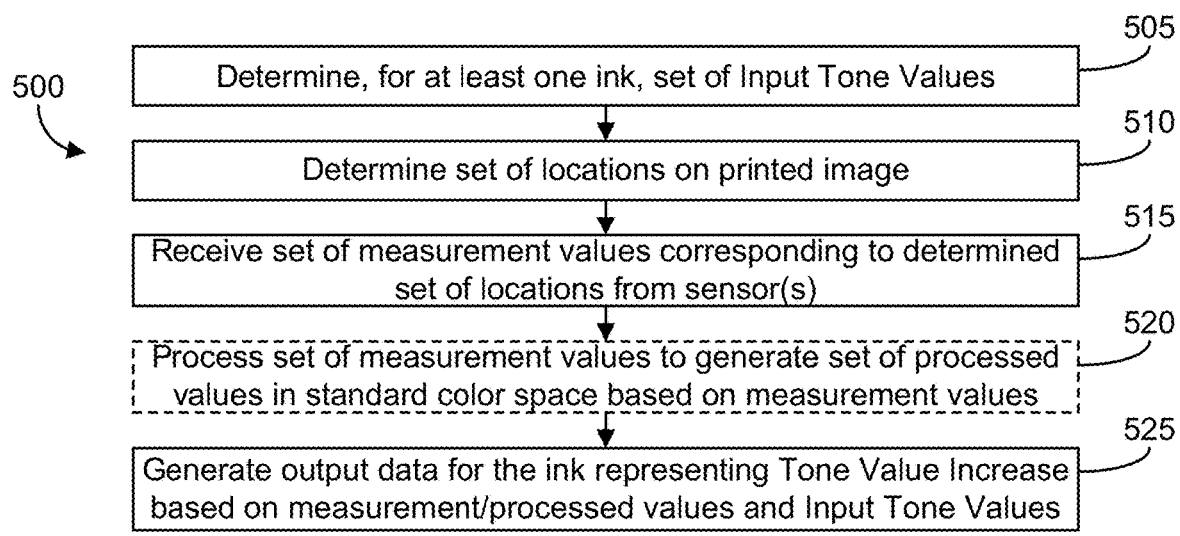
FIG. 5 is a flow diagram of a process for analyzing reproduction of a printed Image on a Substrate according to an exemplary embodiment.
Figure 6:
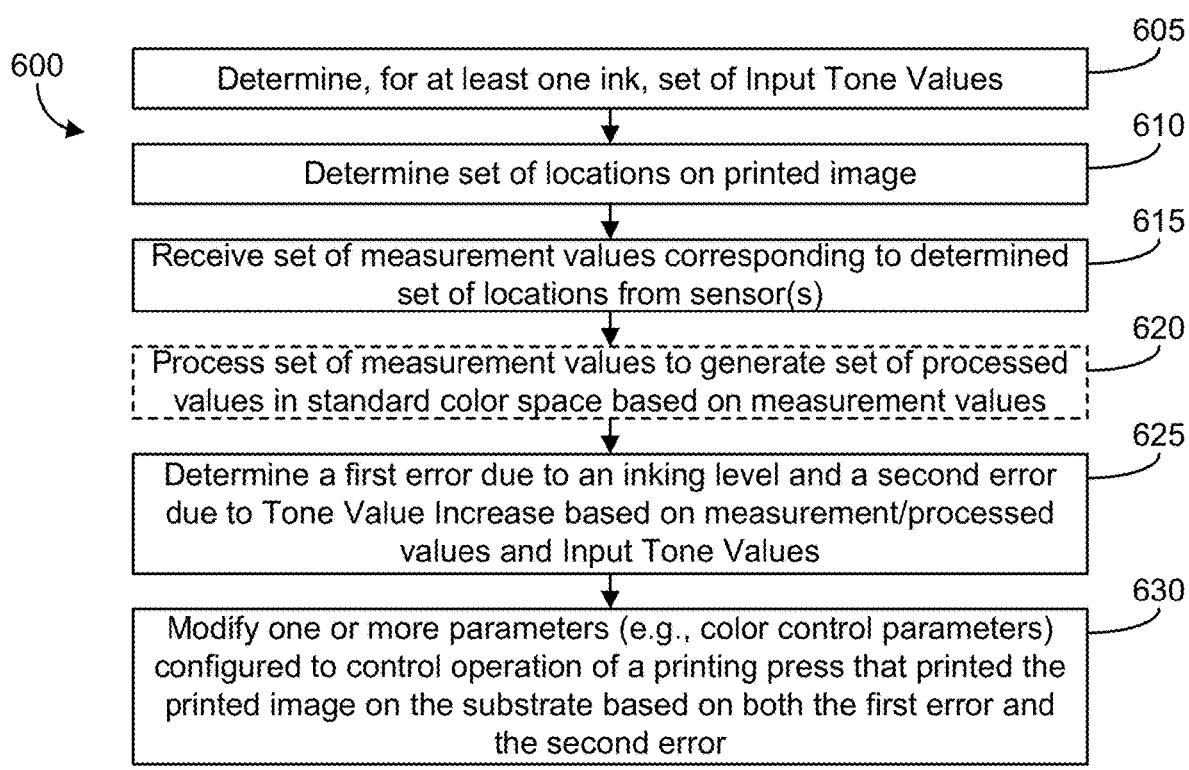
FIG. 6 is a flow diagram of a process for controlling color in a printed Image according to an exemplary embodiment.
Figure 7:
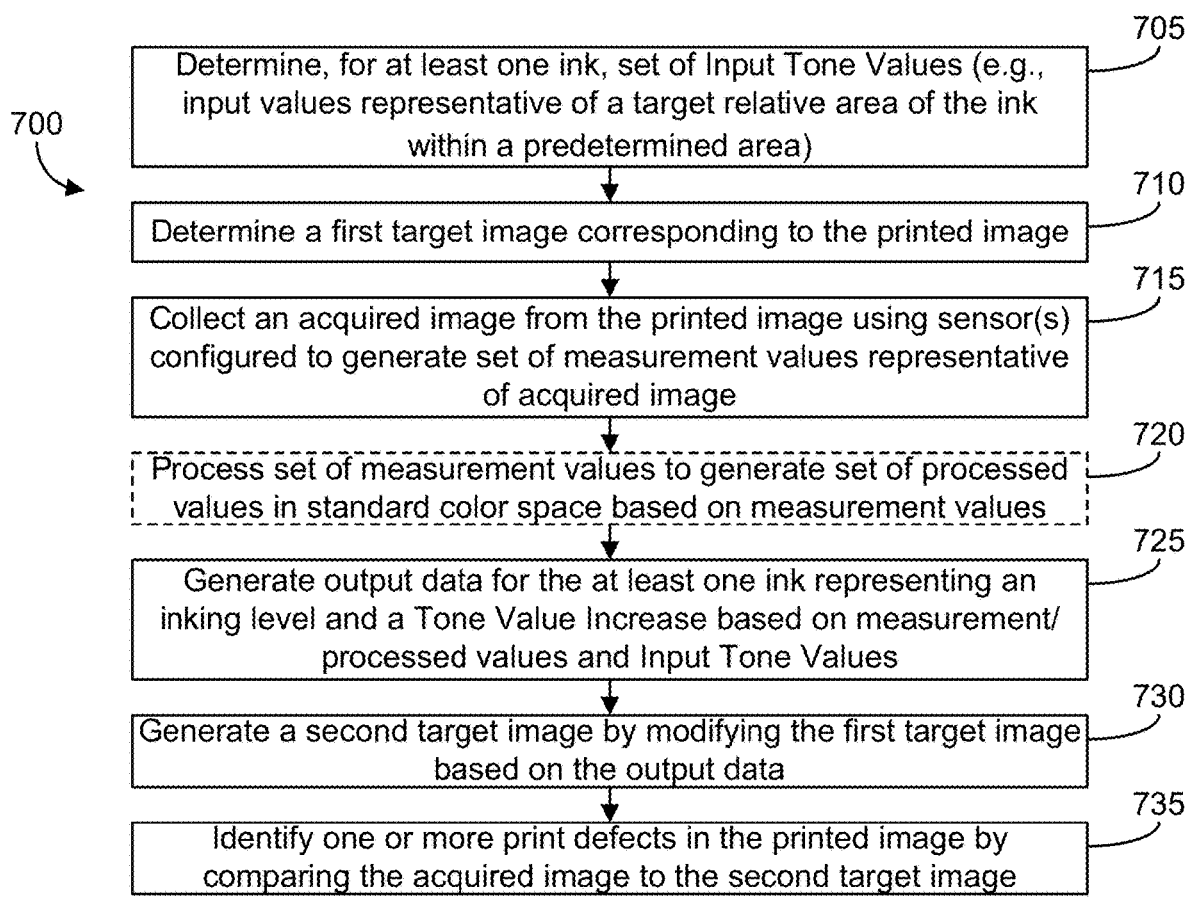
FIG. 7 is a flow diagram of a process for detecting defects in a printed Image according to an exemplary embodiment.

FIGS. 5 through 7 illustrate exemplary processes that may be implemented by processing circuit 400 to perform various functions of processing circuit 400. Referring now to FIG. 5, a flow diagram of a process 500 for analyzing reproduction of a printed Image on a Substrate is shown according to an exemplary embodiment. In some embodiments, process 500 may be implemented, for example, using TVI analysis module 415 of processing circuit 400.

The system may determine, for at least one of the inks, a set of Input Tone Values for at least one of the inks (505). In some embodiments, the Input Tone Values may be used to generate a "target Image." For example, a set of Input Tone Values may be passed through a look up table to create the target Image. The look up table is basically a prediction of what color will be printed by any combination of Tone Values of the constituent inks. The target image may be generated at any time before or during the print process.

The size of such a look up table may be large, so linear interpolation may be used in conjunction with a sparse lookup table.

This look up table may be created through many methods. For example, the look up table may be a characterization data set such as those provided by organizations such as IDEAlliance and Fogra. As another example, it may be created through a mathematical model of the relationship between Tone Values and the resulting color on a printed Substrate, as will be described. As yet another example, a sparse look up table may be generated by printing a test target with a large collection of Tone Values and making measurements of the resulting printed Substrate. One example of such a target is called an IT8 target.

In some embodiments, one or more mathematical models regarding the relationship between Input Tone Values and the resulting color on a printed Substrate may be utilized in generating a target Image. These mathematical color models will now be discussed.

In some embodiments, two types of input may be used for a mathematical color model to generate a target image for use in determining Tone Value Increase: the Input Tone Values, and the press operating parameters. The Input Tone Values have been described previously. The press operating parameters may be, for example, some subset of the following parameters:

- an inking level for each of the constituent inks;
- a base spectrum for each of the constituent inks;
- a trap value which characterizes the proportion of an ink that will be transferred to another;
- an opacity value or spectrum for each of the constituent inks;
- one or more parameters characterizing the reproduction of Halftones, e.g. parameters describing a TVI curve (the relationship between TVI and Tone Value);
- surface reflectance; and/or
- various properties of the Substrate including surface roughness, opacity, and spectrum.

This list is not exhaustive—the exact set of relevant parameters depends on which physical attributes are included within the mathematical color model. Mathematical color models that may be utilized, according to various exemplary embodiments, include, for example, Beer's law, the Tolenaar-Ernst equation, the Kubelka-Munk equation, the Murray-Davies equation, the Yule-Nielsen equation, the Noffke-Seymour equation, and the Neugebauer equation or any of many modifications of the Neugebauer equation as are known in the art, among others.

A second embodiment of a mathematical color model uses a set of equations to estimate the change in spectra with respect to changes (for example) in inking level, rather than the spectra itself. This approach may be especially useful, for example, with estimating the spectra of overprints, where measured values of the overprints may be readily available. One source of error—the estimation error in using Beer's law with trap to estimate the spectrum of the overprints—is thus eliminated.

The estimated change in spectra with respect to changes (for example) in inking level may be established through a formula, or it may be expressed as a derivative. The derivative of interest may be, for example, the change of reflectance of a cyan-magenta overprint at 550 nm per unit change in the inking level. The collection of derivatives may be referred to as the sensitivity values. In some embodiments, such sensitivity values may be used to determine a TVI curve for use in evaluating TVI Error. This may allow for estimation of TVI error using the Image itself, rather than or in addition to using a color bar.

In some embodiments, the complete mathematical model estimates the L*a*b* value for any set of Input Tone Values based on a characterization data set indicative of the printing conditions. In some embodiments, the mathematical model may estimate change in L*a*b* values based on: 1) a change in Solid Ink density and TVI for any of the inks, and/or 2) the sensitivity values.

In some embodiments, the sensitivity values with respect to Solid Ink density may be determined through press tests, where a test target like the IT8 target is printed and inking levels are adjusted throughout the run. In some embodiments, the sensitivity values with respect to TVI may be estimated directly from measurements of a single test target (e.g., IT8 target).

Alternately, sensitivity values can be ascertained through one of the aforementioned mathematical color models.

The system may be configured to determine a set of locations on a printed Image (510). In one embodiment, sets of Color Values can be laid out along a two-dimensional grid to represent the Image. The sets of Color Values could be a representative of locations covering substantially all of the printed Image. Alternately, they could be a representative of locations within one or more contiguous areas of the printed Image, commonly referred to as "regions of interest." These regions of interest could be selected either automatically based on a computer algorithm or manually. Alternately, these sets of Color Values could be individual points scattered through the printed Substrate.

The intended printed Image may be generally communicated through the process in a standardized document format such as a .pdf file. According to some embodiments, in lithographic printing, a process known as raster image processing (RIP) is used to convert this format into ink plate files, which could be one-bit TIFF files. There may be one such file for each of the printing inks. These files define the so-called imaged area of the printing plate, that is to say, the areas of that plate that will be conditioned so as to transfer ink to the Substrate.

The system may receive a set of measurement values corresponding to a determined set of locations from one or more sensors (515). The set of Color Values indicative of an area of a particular printed Substrate will be hereinafter referred to as an "acquired Image." In some embodiments, this acquired Image may be collected offline, which is to say, it may be collected from the printed Substrate apart from the printing device (e.g., press). In some embodiments, the acquired Image will be collected inline, which is to say, on the press itself, while the press is in production.

The measurement values of the acquired Image may be collected using one or more sensors, or imaging devices. In some embodiments, a sensor may be configured to acquire data (e.g., spectral data) over at least four wavelength channels. Each of the channels may correspond to a different range of wavelengths/frequencies. In some embodiments, each channel may be centered around or include a wavelength or range of wavelengths selected so as to be indicative each of a different color of ink. For example one channel may include principally wavelengths in the red region of the visible spectrum so as to be most responsive to changes in the cyan ink and black inks. In some embodiments, the sensor may be configured to acquire and/or generate measurement values in compliance with a standard spectral response, such as an ISO standard (e.g., the standards discussed above). In some such embodiments, the generated measurement values may be approximately the same as (e.g., within a predetermined tolerance of) values that would be generated by a different device that also complies with the same standard, which may help provide uniformity across different sensors without, or with less, calibration.

Acquisition of individual points scattered throughout the printed sheet may be accomplished with the aid of a point measuring spectrophotometer, manually positioned to selected locations on the printing Substrate. Alternately, a spectrophotometer may be positioned by means of an XY scanning table. Alternately, the spectrophotometer may be inline, equipped with a mechanism for laterally traversing the web and a triggering mechanism for making a measurement at a desired location. This inline spectrophotometer may be a hyperspectral device, which is to say, it may simultaneously acquire spectra at a multiplicity of points. In addition, the spectrophotometer may be an abridged spectrophotometer, which acquires reflectance values in something less than a predetermined number (e.g., 30) of spectral bins.

In some embodiments, the system may process the acquired Image (e.g., the set of measurement values) to generate a processed acquired Image (e.g., set of processed values). This may include processing the acquired Image to a processed acquired Image in a standardized color space, based, at least in part, on the measurement values (515). In some embodiments, the data may be processed such that the multi-channel data (e.g., four, six, twelve, twenty-four, thirty-two, etc. wavelength channels) is transformed into a Color Value associated with a standardized color space. In some such embodiments, the data may be processed into Color Values in standardized color spaces such as CIELAB, XYZ, DIN99, etc.

The system may generate output data (e.g., TVI value(s)) for at least one of the inks representing a reproduction of Halftones within the set of locations based on measurement/processed values (e.g., Apparent Tone Value(s)) and input values (e.g., Input Tone Value(s)) (525). In some embodiments, differences between the acquired and the target Image may be calculated. Sensitivity values may be used to determine the set of changes in inking levels, Tone Value, TVI, and/or TVI Error that would best explain the calculated differences. This may be done through a regression process, such as a least squares method. Some example implementations providing color control utilizing sensitivity values that may be utilized in conjunction with the features utilized herein, according to some exemplary embodiments, are provided in U.S. Pat. No. 5,967,050, which is incorporated herein by reference in its entirety.

In some embodiments, the characterization of the reproduction of Halftones may be accomplished by comparing the acquired Image with the estimation provided by a mathematical color model. The input parameters, such as inking levels and TVI values for each ink, are then adjusted so as to minimize the difference between the acquired Image and the estimated Image. In some embodiments, the estimation may additionally or alternatively be provided by a lookup table, such as an ICC profile. Such a table may receive values representing measured differences in TVI, and may generate values in a standardized color space, such as CIELAB, as output.

In some embodiments, the system may be configured to generate output data based only on colors present in a printed Image when the Image includes less than all of the colors (e.g., a solid black Image). The system may be configured to detect when the solution for a particular color or set of colors is underdetermined, such that there is insufficient information to calculate output data for a particular color. For example, in the pure black Image example, the system may recognize that the solution for the cyan, magenta, and yellow colors is underdetermined. In some embodiments, the system may not use the underdetermined ink colors when generating the output data.

In some embodiments, the system may be configured to generate the output data using only the printed Image, and without using a color bar. In some embodiments, the system may generate the output data using both the printed Image and a color bar. In some embodiments, the system may use a reduced color bar to generate the printed Image, such as a color bar including solid patches for each of the inks and only a single overprint Halftone (e.g., a gray patch that is a CMY Halftone overprint).

Referring now to FIG. 6, a flow diagram of a process 600 for controlling color in a printed Image is shown according to an exemplary embodiment. In some embodiments, process 600 may be implemented, for example, using color control module 420 of processing circuit 400.

Color control systems which seek to minimize the overall color error without the need for color bars may not explicitly discriminate between color errors which are due to a) incorrect inking level, and b) incorrect reproduction of Halftones (e.g., Tone Value). Without discrimination of these two parameters, in some cases color control may not be appropriate. For example, if the printing plate wears down during the run, Tone Value may be decreased, as previously described. A color control system which does not discriminate based on the source of color errors will tend to over-apply ink, which is costly because these systems will use more ink than necessary and potentially deleterious to the color of the printed material.

Another instance of color control that may be hampered by failing to discriminate based on the source of color errors is when the printed work contains a large amount of Highlight areas. As previously stated, the color of a Highlight is only mildly responsive to changes to the amount of pigment on the Substrate. Large changes in the amount of pigment will be required to affect relatively small changes in color of a Highlight. Thus, control of color based on measurements of the Highlights can be unstable.

This instability can be exacerbated by consistent (non-random) changes in the rendering of Highlights. These consistent changes may be the result of a change in the state of the printing press, or for example due to the wearing of a printing plate and not based on inking levels.

In some embodiments, the systems and methods of the present disclosure include a color control device which affects control using a printed Image (e.g., without the need for a color bar), but which can discount to a greater or lesser extent, the color errors which are caused by factors other than inconsistent or incorrect inking level.

The system may determine, for at least one ink, a set of Input Tone Values for the set of locations (605) at any time before or during the printing process. The set of Input Tone Values may be representative of, or used to generate, a target Image. The system may determine a set of locations on the printed Image (610) and receive a set of measurement values (e.g., representative of an acquired Image) corresponding to the determined set of locations from one or more sensors (615). In some embodiments, the system may process the set of measurement values to generate a set of processed values in a standardized color space (620). In some embodiments, operations 605 through 620 of process 600 may be performed in a manner similar to that described above with respect to operations 505 through 520, respectively, of process 500.

The system may determine a first error due to an inking level and a second error due to reproduction of Halftones (e.g., TVI) based on the set of measurement/processed values (e.g., Apparent Tone Value(s)) and the set of input values (e.g., Input Tone Value(s)) (625). Differences between the acquired and the target Image may be calculated. The sensitivity values may be used to determine the set of changes in inking levels and TVI that would best explain the calculated differences. This may be done through a regression process, such as a least squares process.

The system may modify one or more parameters (e.g., color control parameters) configured to control operation of a printing press that printed the printed Image on the Substrate based on the first error and the second error (630). In some embodiments, the parameters may control one or more ink control devices, such as ink keys. Control of inking may be actuated based on the changes in inking levels suggested from the color control process. In some embodiments, the color control system completely disregards changes in the press that affect tone value when adjusting inking levels. In some embodiments, the color control system may only partially disregard such changes in tone value (e.g., may be configured to reduce modifications that may result from such changes).

Referring now to FIG. 7, a flow diagram of a process 700 for detecting defects in a printed Image is shown according to an exemplary embodiment. The printing process may be susceptible to a variety of imperfections such as streaks, ink drops and dropouts of color that are not directly related to the inking levels or reproduction of Halftone values. For high quality printing, it is often advantageous to perform defect detection wherein, for example, an RGB camera acquires an Image of all or part of the printed Substrate and subsequently compares this acquired Image to a target Image that was generated from prepress files. A threshold is set for the difference between the acquired Image and the target Image. If this threshold is exceeded, the press operator is alerted and a defect is logged.

Such rudimentary systems may falsely attribute errors in inking (e.g., inking levels or reproduction of Halftones) for other types of defects. Such spurious defect reports can be alleviated by increasing the threshold for defects, which means that certain defects will not be seen.

More sophisticated systems may combine the use of a defect detection system and a color control system in order to isolate differences in color due to inking level from other types of defects as described in U.S. Pat. No. 7,017,492 to Seymour, which is incorporated herein by reference in its entirety. The color control system determines a required adjustment to inking levels, and a prediction is made of the effect of this inking level adjustment. Areas of the Image where there is a large uncorrected color difference are deemed print defects as opposed to defects due to incorrect inking levels. To date, no known defect detection system benefits from isolating color differences due to differences in reproduction of Halftones (e.g., Tone Value) as well as differences in inking level.

In some embodiments of the present disclosure, the systems and methods may include a defect detection system configured to distinguish between defects that are due to incorrect press parameters (e.g., inking levels and reproduction of Halftones) and defects that are due to other types of issues (e.g., other defects from press or plate errors). The system may determine a set of Input Tone Values for one or more locations within the printed Image (705). The system may determine a first target Image corresponding to the printed Image (e.g., based on the Input Tone Values) (710). The system may collect an acquired Image from the printed Image using one or more sensors configured to generate a set of measurement values representative of the acquired Image (715). In some embodiments, the system may process the set of measurement values (e.g., representative of an acquired Image) to generate a set of processed values (e.g., processed acquired Image) in a standardized color space based on the measurement values (720). In some embodiments, operations 705 through 720 of process 700 may be performed in a manner similar to that described above with respect to operations 505 through 520 of process 500.

The system may generate output data for the at least one ink representing an inking level and a reproduction of Halftones (e.g., TVI) based at least in part on the set of measurement/processed values (e.g., Apparent Tone Value(s)) and the set of input values (e.g., Input Tone Value(s)) (725). Differences between the acquired and the target Image may be calculated. The sensitivity values may be used to determine the set of changes in inking levels and TVI that would best explain the calculated differences. This may be done through a regression process, such as a least squares process.

The system may generate a second target Image by modifying the first target Image based on the output data representing the inking level and TVI (e.g., the difference between the target relative amount of ink to be applied within an area of the substrate and the actual relative amount of ink applied within an area of the substrate) (730). The changes in inking levels and/or TVI that best explain the calculated differences may be used to estimate the color of the printed Image if those press parameters were corrected (e.g., using a mathematical color model). In various embodiments, either the acquired Image or the target Image, or both, may be adjusted to generate the second target Image. The system may identify one or more print defects in the printed Image by comparing the acquired Image to the second target Image (735). Locations where significant differences are seen can be flagged as defects. These defects may be communicated to the user through a user interface.

Figure 8:
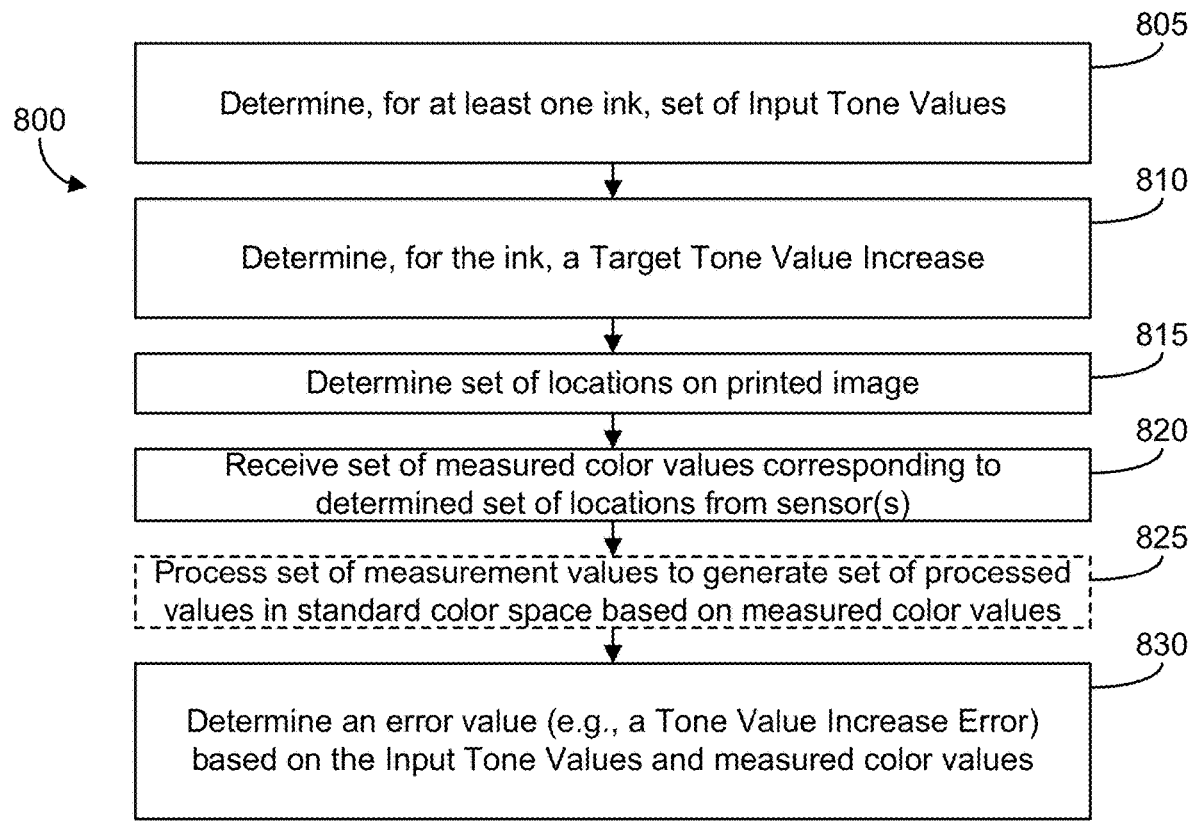
FIG. 8 is a flow diagram of a process for analyzing reproduction of a printed Image on a Substrate according to another exemplary embodiment.

In some embodiments, the system may generate and/or modify parameters based on a TVI error value, rather than or in addition to a TVI value. Referring now to FIG. 8, a flow diagram of a process 800 for analyzing reproduction of a printed Image on a Substrate is shown according to another exemplary embodiment. The system may determine, for at least one ink, a set of one or more Input Tone Values (805). In some embodiments, the system may determine a Target Tone Value Increase (810).

The system may determine a set of one or more locations on the printed image for measuring Color Values (815). In some embodiments, the system may determine a set of target Color Values for the one or more locations based on the Input Tone Values and/or the Target TVI. The system may receive a set of measured Color Values corresponding to the set of locations from one or more sensors (820). In some embodiments, the system may process the set of measurement values to generate a set of processed values in a standardized color space (825).

The system may determine an error value (e.g., a Tone Value Increase Error, or TVI Error) based on the Input Tone Values and the measured Color Values (830). In some embodiments, the system may be configured to determine the TVI error without requiring measurement of an area including a solid ink (e.g., an area having a predefined target richness/strength value for the ink(s), such as a maximum richness/strength value). In some embodiments, the system may determine the TVI error using one or more sensitivity values, such as a sensitivity matrix. For example, the Input Tone Values and the measured Color Values may be processed through a matrix of sensitivity values (e.g., as described above according to exemplary embodiments) to determine/estimate the TVI error. In some such embodiments, the sensitivity matrix may be used to infer the TVI Error(s) and/or color errors most likely to be responsible for the differences between the Target TVI and an Apparent TVI reflected in the measured Color Values. In some embodiments, the TVI Error may be determined using the target Color Values for the measurement locations and the measured Color Values.

In some embodiments, the system may provide data based on the TVI Error to a press operator (e.g., via a display device) and/or use the TVI Error to adjust one or more press parameters. For example, if the TVI Error indicates that the Apparent TVI is greater than the Target TVI, press parameters may be adjusted to decrease the Apparent TVI for subsequent print runs. If the TVI Error indicates that the Apparent TVI is less than the Target TVI, in some embodiments, no action may be taken, and in other embodiments, press parameters may be adjusted to increase the Apparent TVI closer to the expected value for subsequent print runs. In some embodiments, the amount of adjustment to the press parameters may be based on the TVI Error. For example, a greater TVI Error may lead to greater adjustments to parameters than a smaller TVI Error. In some embodiments, the TVI Error may be used in color control and/or defect detection.

Figure 9:
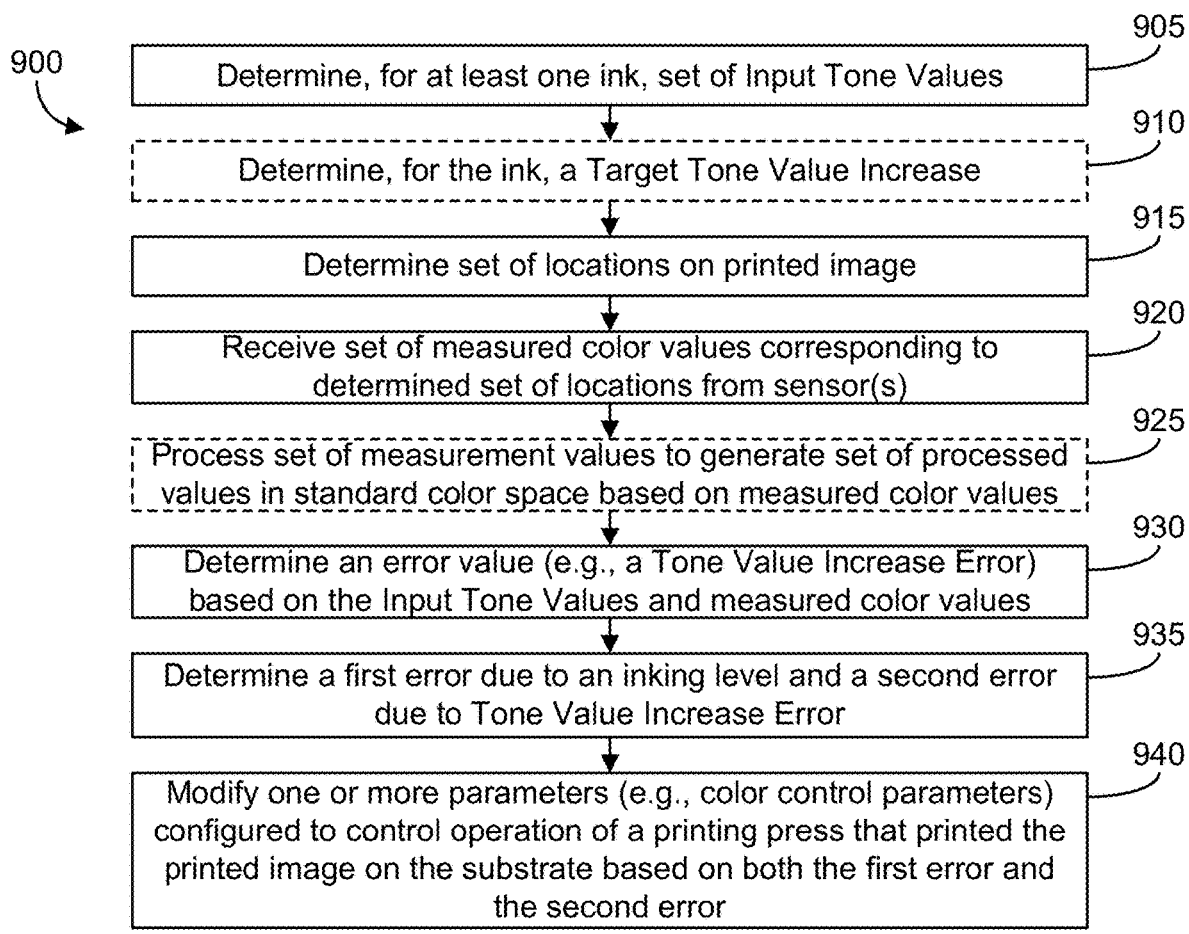
FIG. 9 is a flow diagram of a process for controlling color in a printed Image according to another exemplary embodiment.

Referring now to FIG. 9, a flow diagram of a process 900 for controlling color in a printed Image is shown according to another exemplary embodiment. The system may determine, for at least one ink, a set of one or more Input Tone Values (905). In some embodiments, the system may determine a Target Tone Value Increase (910). The system may determine a set of one or more locations on the printed image for measuring Color Values (915) and receive a set of measured Color Values corresponding to the set of locations from one or more sensors (920). In some embodiments, the system may process the set of measurement values to generate a set of processed values in a standardized color space (925). The system may determine a first error due to an inking level and a second error due to TVI Error (930). The system may modify one or more parameters (e.g., color control parameters) configured to control operation of the printing press that printed the Image on the Substrate based on both the first error and the second error (935). In some embodiments, the system may separate the errors and/or separately use the errors to modify the parameters. For example, in some embodiments, the system may be configured to control the parameters based on the inking level errors, the TVI Errors, or a combination of both.

Figure 10:
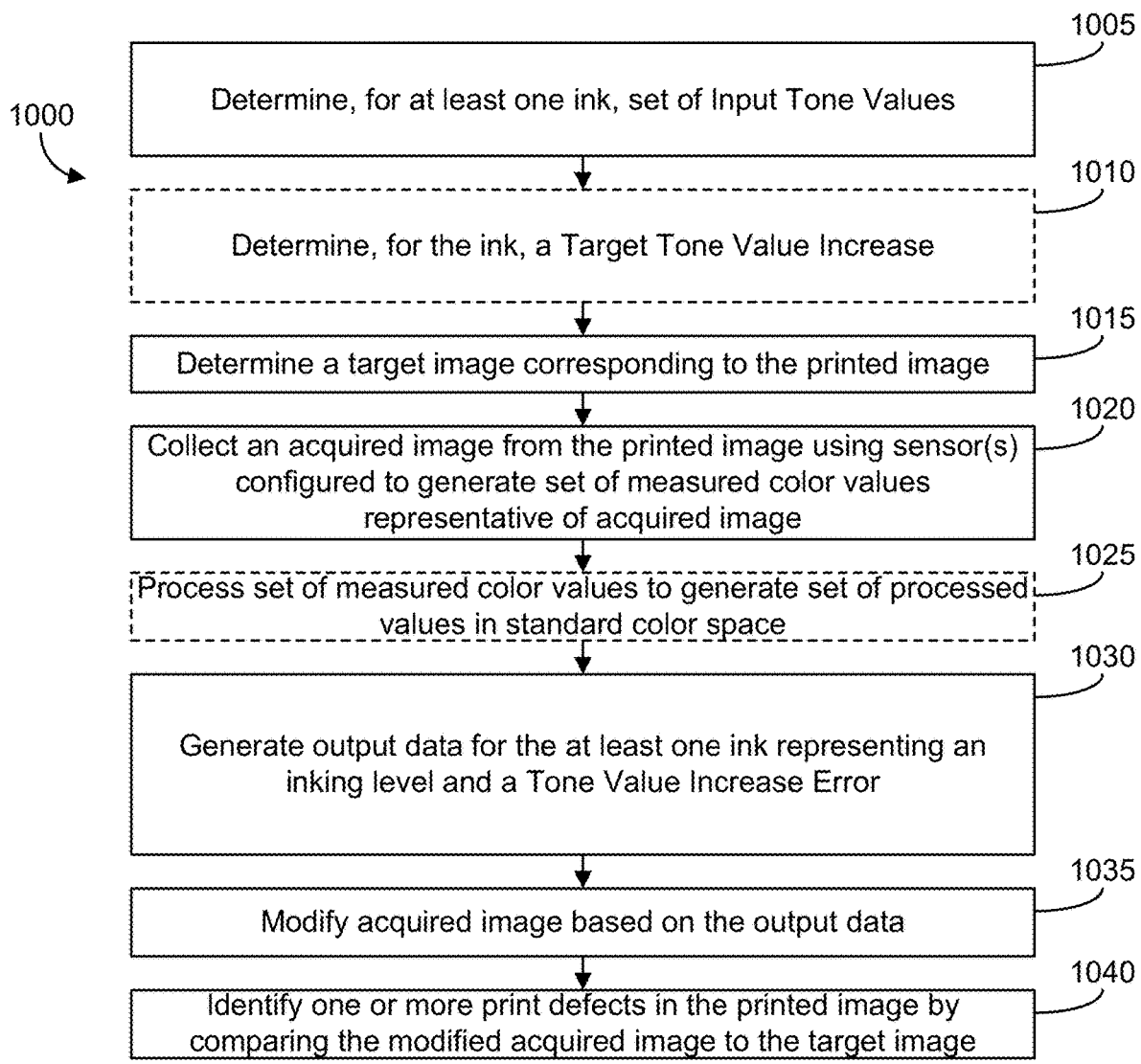
FIG. 10 is a flow diagram of a process for detecting defects in a printed Image according to another exemplary embodiment.

Referring now to FIG. 10, a flow diagram of a process 1000 for detecting defects in a printed Image is shown according to another exemplary embodiment. The system may determine, for at least one ink, a set of one or more Input Tone Values (1005). In some embodiments, the system may determine a Target Tone Value Increase (1010). The system may determine a target Image corresponding to the printed image (1015) and collect an acquired Image from the printed image using one or more sensors configured to generate a set of measured Color Values representative of the acquired Image (1020). In some embodiments, the system may process the set of measured Color Values to generate a set of processed values in a standardized color space (1025).

The system may generate output data for the ink representing an inking level and a TVI Error (1030). The system may modify the acquired Image based on the output data (1035). For example, a new Image may be generated by modifying the acquired Image to account for changes from the target image due to errors in inking level and/or TVI Error. The system may identify one or more print defects in the printed Image by comparing the modified acquired image to the target image (1040). For example, if the modified acquired image is substantially different than the target Image, this may indicate that the differences are not due to inking level errors and/or TVI Error, and may be due to print defects.

While the various embodiments described herein are shown having operations in a particular order, it should be understood that the operations shown in processes 500 through 1000, and in various other embodiments described herein, can be performed in any order and/or in partial or complete concurrence unless otherwise stated. For example, in some embodiments, a set of input tone values may be determined, and a set of locations on the printed image from which to measure values may be determined (e.g., based at least in part on the input tone value data, such as by measuring at locations associated with the input tone values). In some embodiments, a set of locations from which measured values will be obtained is determined, and then a set of input tone values may be determined (e.g., corresponding to the determined locations). All such modifications are contemplated within the scope of the present disclosure and the description of processes 500 through 1000 above.

While various features are described with respect to processes 500 through 1000, it should be understood that, in general, features described with respect to one of processes 500 through 1000 may be utilized with others of 500 through 1000. For example, the types of sensors described with respect to process 500 may be utilized with respect to processes 600 through 1000 as well. In some embodiments, processes 500 through 1000 may be implemented using more than one sensor. In some embodiments, processes 500 through 1000 may be implemented using a color bar, without a color bar, with a reduced color bar, etc., as described with respect to process 500. In some embodiments, processes 500 through 1000 may allow for determination/estimation of a TVI Error without requiring measurement from a solid ink area in the printed Image (e.g., a solid ink portion of a color bar).

Various embodiments described above may be used to detect errors and/or modify print parameters (e.g., for color control and/or defect detection) either pre-press (e.g., prior to a print run in which a plurality of printed images are printed on the substrate) or during print (e.g., while a plurality of printed images are being printed on the substrate). For example, in some pre-press implementations, determined TVI and/or TVI Error values may be used to modify parameters of one or more input algorithms to more accurately reflect conditions on a printing press (e.g., by providing the TVI and/or TVI Error values to a pre-press module configured to modify the parameters, such as a pre-press processing circuit). In some print-time implementations, determined TVI and/or TVI Error values may be used to modify parameters to control one or more ink control devices to make changes to printed Images during a print run (e.g., on-the-fly).

The disclosure is described above with reference to drawings. These drawings illustrate certain details of specific embodiments that implement the systems and methods and programs of the present disclosure. However, describing the disclosure with drawings should not be construed as imposing on the disclosure any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system. No claim element herein is to be construed as a "means plus function" element unless the element is expressly recited using the phrase "means for." Furthermore, no element, component or method step in the present disclosure is intended to be dedicated to the public, regardless of whether the element, component or method step is explicitly recited in the claims.

As noted above, embodiments within the scope of the present disclosure include program products comprising machine-readable storage media for carrying or having machine-executable instructions or data structures stored thereon. Such machine-readable storage media can be any available media that can be accessed by a machine with a processing circuit (e.g., processor). By way of example, such machine-readable storage media can include RAM, ROM, EPROM, EEPROM, CD ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable storage media. Machine-executable instructions include, for example, instructions and data which cause a general purpose computer, special purpose computer, or special purpose processing machine to perform a certain function or group of functions. Machine or computer-readable storage media, as referenced herein, do not include transitory media (i.e., signals in space).

Embodiments of the disclosure are described in the general context of method steps which may be implemented in one embodiment by a program product including machine-executable instructions, such as program code, for example, in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

It should be noted that although the flowcharts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the disclosure. Likewise, software implementations of the present disclosure could be accomplished with standard programming techniques with rule-based logic and other logic to accomplish the various steps. It should also be noted that the word "component" as used herein is intended to encompass implementations using one or more lines of software code, and/or hardware implementations, and/or equipment for receiving manual inputs.

Alternative Embodiments

Another embodiment relates to a system for analyzing reproduction of a printed image on a substrate printed using a plurality of inks. The system includes at least one processing circuit configured to determine a set of one or more locations on the printed image on the substrate to measure color values. The at least one processing circuit is further configured to determine a set of input tone values for the at least one ink. The at least one processing circuit is further configured to receive a set of measured color values corresponding to the set of locations on the printed image from a sensor. In various embodiments: (1) the sensor is configured to generate the measurement values to be compliant with a standard spectral response; (2) the sensor is configured to generate the measurement values based on data measured using at least four wavelength channels; and/or (3) the at least one processing circuit is configured to process the set of measurement values to generate a set of processed values in a standardized color space based on the set of measurement values. The at least one processing circuit is further configured to determine a tone value increase based on the set of measurement/processed values and the set of input tone values. The at least one processing circuit is configured to determine the tone value increase without requiring measured color values from an area having solid ink.

Another embodiment relates to a method of analyzing reproduction of a printed image on a substrate printed using a plurality of inks. The method includes determining a set of one or more locations on the printed image on the substrate to measure color values. The method further includes determining a set of input tone values for the at least one ink. The method further includes receiving a set of measured color values corresponding to the set of locations on the printed image from a sensor. In various embodiments: (1) the sensor is configured to generate the measurement values to be compliant with a standard spectral response; (2) the sensor is configured to generate the measurement values based on data measured using at least four wavelength channels; and/or (3) the method further includes processing the set of measurement values to generate a set of processed values in a standardized color space based on the set of measurement values. The method further includes determining a tone value increase based on the set of measurement/processed values and the set of input tone values without requiring measured color values from an area having solid ink.

Another embodiment relates to a printing system including at least one ink control device configured to control deposition of at least one ink on a substrate to generate a printed image. The printing system further includes at least one processing circuit configured to determine a set of one or more locations on the printed image on the substrate to measure color values and determine a set of input tone values for the at least one ink. The at least one processing circuit is further configured to receive a set of measured color values corresponding to the set of locations on the printed image from a sensor. In various embodiments: (1) the sensor is configured to generate the measurement values to be compliant with a standard spectral response; (2) the sensor is configured to generate the measurement values based on data measured using at least four wavelength channels; and/or (3) the at least one processing circuit is configured to process the set of measurement values to generate a set of processed values in a standardized color space based on the set of measurement values. The at least one processing circuit is further configured to determine a tone value increase based on the set of measurement/processed values and the set of input tone values and control the at least one ink control device based at least in part on the tone value increase. The at least one processing circuit is configured to determine the tone value increase without requiring measured color values from an area having solid ink.

Another embodiment relates to one or more computer-readable storage media having instructions stored thereon that, when executed by one or more processors, cause the one or more processors to implement operations including determining a set of one or more locations on the printed image on the substrate to measure color values. The operations further include determining a set of input tone values for the at least one ink. The operations further include receiving a set of measured color values corresponding to the set of locations on the printed image from a sensor. In various embodiments: (1) the sensor is configured to generate the measurement values to be compliant with a standard spectral response; (2) the sensor is configured to generate the measurement values based on data measured using at least four wavelength channels; and/or (3) the operations further include processing the set of measurement values to generate a set of processed values in a standardized color space based on the set of measurement values. The operations further include determining a tone value increase based on the set of measurement/processed values and the set of input tone values without requiring measured color values from an area having solid ink.

Another embodiment relates to a system for controlling color on a printing press configured to generate a printed image on a substrate using a plurality of inks. The system includes at least one processing circuit configured to determine a set of one or more locations on the printed image on the substrate to measure color values. The at least one processing circuit is further configured to determine a set of input tone values for the at least one ink. The at least one processing circuit is further configured to receive a set of measured color values corresponding to the set of locations on the printed image from a sensor. In various embodiments: (1) the sensor is configured to generate the measurement values to be compliant with a standard spectral response; (2) the sensor is configured to generate the measurement values based on data measured using at least four wavelength channels; and/or (3) the at least one processing circuit is configured to process the set of measurement values to generate a set of processed values in a standardized color space based on the set of measurement values. The at least one processing circuit is further configured to determine a first error due to an inking level and a second error due to a tone value increase based on the set of measurement/processed values and the set of input tone values. The at least one processing circuit is configured to determine the second error due to the tone value increase without requiring measured color values from an area having solid ink. The at least one processing circuit is further configured to modify one or more parameters configured to control operation of a printing press that printed the printed image on the substrate based on the first error and the second error.

Another embodiment relates to a method of controlling color on a printing press configured to generate a printed image on a substrate using a plurality of inks. The method includes determining a set of one or more locations on the printed image on the substrate to measure color values. The method further includes determining a set of input tone values for the at least one ink. The method further includes receiving a set of measured color values corresponding to the set of locations on the printed image from a sensor. In various embodiments: (1) the sensor is configured to generate the measurement values to be compliant with a standard spectral response; (2) the sensor is configured to generate the measurement values based on data measured using at least four wavelength channels; and/or (3) the method further includes processing the set of measurement values to generate a set of processed values in a standardized color space based on the set of measurement values. The method further includes determining a first error due to an inking level and a second error due to a tone value increase based on the set of measurement/processed values and the set of input tone values. The second error due to the tone value increase is determined without requiring measured color values from an area having solid ink. The method further includes modifying one or more parameters configured to control operation of a printing press that printed the printed image on the substrate based on the first error and the second error.

Another embodiment relates to a printing system including at least one ink control device configured to control deposition of at least one ink on a substrate to generate a printed image. The printing system further includes at least one processing circuit configured to determine a set of one or more locations on the printed image on the substrate to measure color values. The at least one processing circuit is further configured to determine a set of input tone values for the at least one ink. The at least one processing circuit is further configured to receive a set of measured color values corresponding to the set of locations on the printed image from a sensor. In various embodiments: (1) the sensor is configured to generate the measurement values to be compliant with a standard spectral response; (2) the sensor is configured to generate the measurement values based on data measured using at least four wavelength channels; and/or (3) the at least one processing circuit is configured to process the set of measurement values to generate a set of processed values in a standardized color space based on the set of measurement values. The at least one processing circuit is further configured to determine a first error due to an inking level and a second error due to a tone value increase based on the set of measurement/processed values and the set of input tone values. The at least one processing circuit is configured to determine the second error due to the tone value increase without requiring measured color values from an area having solid ink. The at least one processing circuit is further configured to modify one or more parameters configured to control operation of the at least one ink control device based on the first error and the second error.

Another embodiment relates to one or more computer-readable storage media having instructions stored thereon that, when executed by one or more processors, cause the one or more processors to implement operations including determining a set of one or more locations on the printed image on the substrate to measure color values. The operations further include determining a set of input tone values for the at least one ink. The operations further include receiving a set of measured color values corresponding to the set of locations on the printed image from a sensor. In various embodiments: (1) the sensor is configured to generate the measurement values to be compliant with a standard spectral response; (2) the sensor is configured to generate the measurement values based on data measured using at least four wavelength channels; and/or (3) the operations further include processing the set of measurement values to generate a set of processed values in a standardized color space based on the set of measurement values. The operations further include determining a first error due to an inking level and a second error due to a tone value increase based on the set of measurement/processed values and the set of input tone values. The second error due to the tone value increase is determined without requiring measured color values from an area having solid ink. The operations further include modifying one or more parameters configured to control operation of a printing press that printed the printed image on the substrate based on the first error and the second error.

Another embodiment relates to a system for defect detection on a printing press configured to generate a printed image on a substrate using a plurality of inks. The system includes at least one processing circuit configured to determine a set of input tone values for the at least one ink. The at least one processing circuit is further configured to determine a first target image corresponding to the printed image and collect an acquired image from the printed image on the substrate using a sensor. The sensor is configured to generate a set of measurement values representing the acquired image. In various embodiments: (1) the sensor is configured to generate the measurement values to be compliant with a standard spectral response; (2) the sensor is configured to generate the measurement values based on data measured using at least four wavelength channels; and/or (3) the at least one processing circuit is configured to process the set of measurement values to generate a set of processed values in a standardized color space based on the set of measurement values. The at least one processing circuit is further configured to generate output data for the at least one ink representing an inking level and a tone value increase based on the set of measurement/processed values and the set of input values. The at least one processing circuit is further configured to generate a second target image by modifying the first target image based on the output data representing the inking level and the tone value increase. The at least one processing circuit is further configured to identify one or more print defects in the printed image by comparing the acquired image to the second target image.

Another embodiment relates to a method of defect detection on a printing press configured to generate a printed image on a substrate using a plurality of inks. The method includes determining a set of input tone values for the at least one ink. The method further includes determining a first target image corresponding to the printed image and collecting an acquired image from the printed image on the substrate using a sensor. The sensor is configured to generate a set of measurement values representing the acquired image. In various embodiments: (1) the sensor is configured to generate the measurement values to be compliant with a standard spectral response; (2) the sensor is configured to generate the measurement values based on data measured using at least four wavelength channels; and/or (3) the method further includes processing the set of measurement values to generate a set of processed values in a standardized color space based on the set of measurement values. The method further includes generating output data for the at least one ink representing an inking level and a tone value increase based on the set of measurement/processed values and the set of input values. The method further includes generating a second target image by modifying the first target image based on the output data representing the inking level and the tone value increase. The method further includes identifying one or more print defects in the printed image by comparing the acquired image to the second target image.

Another embodiment relates to a printing system including at least one ink control device configured to control deposition of at least one ink on a substrate to generate a printed image. The printing system further includes configured to determine a set of input tone values for the at least one ink. The at least one processing circuit is further configured to determine a first target image corresponding to the printed image and collect an acquired image from the printed image on the substrate using a sensor. The sensor is configured to generate a set of measurement values representing the acquired image. In various embodiments: (1) the sensor is configured to generate the measurement values to be compliant with a standard spectral response; (2) the sensor is configured to generate the measurement values based on data measured using at least four wavelength channels; and/or (3) the at least one processing circuit is configured to process the set of measurement values to generate a set of processed values in a standardized color space based on the set of measurement values. The at least one processing circuit is further configured to generate output data for the at least one ink representing an inking level and a tone value increase based on the set of measurement/processed values and the set of input values. The at least one processing circuit is further configured to generate a second target image by modifying the first target image based on the output data representing the inking level and the tone value increase. The at least one processing circuit is further configured to identify one or more print defects in the printed image by comparing the acquired image to the second target image.

Another embodiment relates to one or more computer-readable storage media having instructions stored thereon that, when executed by one or more processors, cause the one or more processors to implement operations including determining a set of input tone values for the at least one ink. The operations further include determining a first target image corresponding to the printed image and collecting an acquired image from the printed image on the substrate using a sensor. The sensor is configured to generate a set of measurement values representing the acquired image. In various embodiments: (1) the sensor is configured to generate the measurement values to be compliant with a standard spectral response; (2) the sensor is configured to generate the measurement values based on data measured using at least four wavelength channels; and/or (3) the operations further include processing the set of measurement values to generate a set of processed values in a standardized color space based on the set of measurement values. The operations further include generating output data for the at least one ink representing an inking level and a tone value increase based on the set of measurement/processed values and the set of input values. The operations further include generating a second target image by modifying the first target image based on the output data representing the inking level and the tone value increase. The operations further include identifying one or more print defects in the printed image by comparing the acquired image to the second target image.

Another embodiment relates to a system for analyzing reproduction of a printed image on a substrate printed using a plurality of inks. The system includes at least one processing circuit configured to determine a set of one or more locations on the printed image on the substrate to measure color values. The at least one processing circuit is further configured to determine a set of input tone values for the at least one ink. The at least one processing circuit is further configured to receive a set of measured color values corresponding to the set of locations on the printed image from a sensor. In various embodiments: (1) the sensor is configured to generate the measurement values to be compliant with a standard spectral response; (2) the sensor is configured to generate the measurement values based on data measured using at least four wavelength channels; and/or (3) the at least one processing circuit is configured to process the set of measurement values to generate a set of processed values in a standardized color space based on the set of measurement values. The at least one processing circuit is further configured to determine a tone value increase error based on the set of measurement/processed values and the set of input tone values. The at least one processing circuit is configured to determine the tone value increase error without requiring measured color values from an area having solid ink.

Another embodiment relates to a method of analyzing reproduction of a printed image on a substrate printed using a plurality of inks. The method includes determining a set of one or more locations on the printed image on the substrate to measure color values. The method further includes determining a set of input tone values for the at least one ink. The method further includes receiving a set of measured color values corresponding to the set of locations on the printed image from a sensor. In various embodiments: (1) the sensor is configured to generate the measurement values to be compliant with a standard spectral response; (2) the sensor is configured to generate the measurement values based on data measured using at least four wavelength channels; and/or (3) the method further includes processing the set of measurement values to generate a set of processed values in a standardized color space based on the set of measurement values. The method further includes determining a tone value increase error based on the set of measurement/processed values and the set of input tone values without requiring measured color values from an area having solid ink.

Another embodiment relates to a printing system including at least one ink control device configured to control deposition of at least one ink on a substrate to generate a printed image. The printing system further includes at least one processing circuit configured to determine a set of one or more locations on the printed image on the substrate to measure color values and determine a set of input tone values for the at least one ink. The at least one processing circuit is further configured to receive a set of measured color values corresponding to the set of locations on the printed image from a sensor. In various embodiments: (1) the sensor is configured to generate the measurement values to be compliant with a standard spectral response; (2) the sensor is configured to generate the measurement values based on data measured using at least four wavelength channels; and/or (3) the at least one processing circuit is configured to process the set of measurement values to generate a set of processed values in a standardized color space based on the set of measurement values. The at least one processing circuit is further configured to determine a tone value increase error based on the set of measurement/processed values and the set of input tone values and control the at least one ink control device based at least in part on the tone value increase. The at least one processing circuit is configured to determine the tone value increase error without requiring measured color values from an area having solid ink.

Another embodiment relates to one or more computer-readable storage media having instructions stored thereon that, when executed by one or more processors, cause the one or more processors to implement operations including determining a set of one or more locations on the printed image on the substrate to measure color values. The operations further include determining a set of input tone values for the at least one ink. The operations further include receiving a set of measured color values corresponding to the set of locations on the printed image from a sensor. In various embodiments: (1) the sensor is configured to generate the measurement values to be compliant with a standard spectral response; (2) the sensor is configured to generate the measurement values based on data measured using at least four wavelength channels; and/or (3) the operations further include processing the set of measurement values to generate a set of processed values in a standardized color space based on the set of measurement values. The operations further include determining a tone value increase error based on the set of measurement/processed values and the set of input tone values without requiring measured color values from an area having solid ink.

Another embodiment relates to a system for controlling color on a printing press configured to generate a printed image on a substrate using a plurality of inks. The system includes at least one processing circuit configured to determine a set of one or more locations on the printed image on the substrate to measure color values. The at least one processing circuit is further configured to determine a set of input tone values for the at least one ink. The at least one processing circuit is further configured to receive a set of measured color values corresponding to the set of locations on the printed image from a sensor. In various embodiments: (1) the sensor is configured to generate the measurement values to be compliant with a standard spectral response; (2) the sensor is configured to generate the measurement values based on data measured using at least four wavelength channels; and/or (3) the at least one processing circuit is configured to process the set of measurement values to generate a set of processed values in a standardized color space based on the set of measurement values. The at least one processing circuit is further configured to determine a first error due to an inking level and a second error due to a tone value increase error based on the set of measurement/ processed values and the set of input tone values. The at least one processing circuit is configured to determine the second error due to the tone value increase error without requiring measured color values from an area having solid ink. The at least one processing circuit is further configured to modify one or more parameters configured to control operation of a printing press that printed the printed image on the substrate based on the first error and the second error.

Another embodiment relates to a method of controlling color on a printing press configured to generate a printed image on a substrate using a plurality of inks. The method includes determining a set of one or more locations on the printed image on the substrate to measure color values. The method further includes determining a set of input tone values for the at least one ink. The method further includes receiving a set of measured color values corresponding to the set of locations on the printed image from a sensor. In various embodiments: (1) the sensor is configured to generate the measurement values to be compliant with a standard spectral response; (2) the sensor is configured to generate the measurement values based on data measured using at least four wavelength channels; and/or (3) the method further includes processing the set of measurement values to generate a set of processed values in a standardized color space based on the set of measurement values. The method further includes determining a first error due to an inking level and a second error due to a tone value increase error based on the set of measurement/processed values and the set of input tone values. The second error due to the tone value increase error is determined without requiring measured color values from an area having solid ink. The method further includes modifying one or more parameters configured to control operation of a printing press that printed the printed image on the substrate based on the first error and the second error.

Another embodiment relates to a printing system including at least one ink control device configured to control deposition of at least one ink on a substrate to generate a printed image. The printing system further includes at least one processing circuit configured to determine a set of one or more locations on the printed image on the substrate to measure color values. The at least one processing circuit is further configured to determine a set of input tone values for the at least one ink. The at least one processing circuit is further configured to receive a set of measured color values corresponding to the set of locations on the printed image from a sensor. In various embodiments: (1) the sensor is configured to generate the measurement values to be compliant with a standard spectral response; (2) the sensor is configured to generate the measurement values based on data measured using at least four wavelength channels; and/or (3) the at least one processing circuit is configured to process the set of measurement values to generate a set of processed values in a standardized color space based on the set of measurement values. The at least one processing circuit is further configured to determine a first error due to an inking level and a second error due to a tone value increase error based on the set of measurement/processed values and the set of input tone values. The at least one processing circuit is configured to determine the second error due to the tone value increase error without requiring measured color values from an area having solid ink. The at least one processing circuit is further configured to modify one or more parameters configured to control operation of the at least one ink control device based on the first error and the second error.

Another embodiment relates to one or more computer-readable storage media having instructions stored thereon that, when executed by one or more processors, cause the one or more processors to implement operations including determining a set of one or more locations on the printed image on the substrate to measure color values. The operations further include determining a set of input tone values for the at least one ink. The operations further include receiving a set of measured color values corresponding to the set of locations on the printed image from a sensor. In various embodiments: (1) the sensor is configured to generate the measurement values to be compliant with a standard spectral response; (2) the sensor is configured to generate the measurement values based on data measured using at least four wavelength channels; and/or (3) the operations further include processing the set of measurement values to generate a set of processed values in a standardized color space based on the set of measurement values. The operations further include determining a first error due to an inking level and a second error due to a tone value increase error based on the set of measurement/processed values and the set of input tone values. The second error due to the tone value increase error is determined without requiring measured color values from an area having solid ink. The operations further include modifying one or more parameters configured to control operation of a printing press that printed the printed image on the substrate based on the first error and the second error.

Another embodiment relates to a system for defect detection on a printing press configured to generate a printed image on a substrate using a plurality of inks. The system includes at least one processing circuit configured to determine a set of input tone values for the at least one ink. The at least one processing circuit is further configured to determine a first target image corresponding to the printed image and collect an acquired image from the printed image on the substrate using a sensor. The sensor is configured to generate a set of measurement values representing the acquired image. In various embodiments: (1) the sensor is configured to generate the measurement values to be compliant with a standard spectral response; (2) the sensor is configured to generate the measurement values based on data measured using at least four wavelength channels; and/or (3) the at least one processing circuit is configured to process the set of measurement values to generate a set of processed values in a standardized color space based on the set of measurement values. The at least one processing circuit is further configured to generate output data for the at least one ink representing an inking level and a tone value increase error based on the set of measurement/processed values and the set of input values. The at least one processing circuit is further configured to generate a second target image by modifying the first target image based on the output data representing the inking level and the tone value increase error. The at least one processing circuit is further configured to identify one or more print defects in the printed image by comparing the acquired image to the second target image.

Another embodiment relates to a method of defect detection on a printing press configured to generate a printed image on a substrate using a plurality of inks. The method includes determining a set of input tone values for the at least one ink. The method further includes determining a first target image corresponding to the printed image and collecting an acquired image from the printed image on the substrate using a sensor. The sensor is configured to generate a set of measurement values representing the acquired image. In various embodiments: (1) the sensor is configured to generate the measurement values to be compliant with a standard spectral response; (2) the sensor is configured to generate the measurement values based on data measured using at least four wavelength channels; and/or (3) the method further includes processing the set of measurement values to generate a set of processed values in a standardized color space based on the set of measurement values. The method further includes generating output data for the at least one ink representing an inking level and a tone value increase error based on the set of measurement/processed values and the set of input values. The method further includes generating a second target image by modifying the first target image based on the output data representing the inking level and the tone value increase error. The method further includes identifying one or more print defects in the printed image by comparing the acquired image to the second target image.

Another embodiment relates to a printing system including at least one ink control device configured to control deposition of at least one ink on a substrate to generate a printed image. The printing system further includes configured to determine a set of input tone values for the at least one ink. The at least one processing circuit is further configured to determine a first target image corresponding to the printed image and collect an acquired image from the printed image on the substrate using a sensor. The sensor is configured to generate a set of measurement values representing the acquired image. In various embodiments: (1) the sensor is configured to generate the measurement values to be compliant with a standard spectral response; (2) the sensor is configured to generate the measurement values based on data measured using at least four wavelength channels; and/or (3) the at least one processing circuit is configured to process the set of measurement values to generate a set of processed values in a standardized color space based on the set of measurement values. The at least one processing circuit is further configured to generate output data for the at least one ink representing an inking level and a tone value increase error based on the set of measurement/processed values and the set of input values. The at least one processing circuit is further configured to generate a second target image by modifying the first target image based on the output data representing the inking level and the tone value increase error. The at least one processing circuit is further configured to identify one or more print defects in the printed image by comparing the acquired image to the second target image.

Another embodiment relates to one or more computer-readable storage media having instructions stored thereon that, when executed by one or more processors, cause the one or more processors to implement operations including determining a set of input tone values for the at least one ink. The operations further include determining a first target image corresponding to the printed image and collecting an acquired image from the printed image on the substrate using a sensor. The sensor is configured to generate a set of measurement values representing the acquired image. In various embodiments: (1) the sensor is configured to generate the measurement values to be compliant with a standard spectral response; (2) the sensor is configured to generate the measurement values based on data measured using at least four wavelength channels; and/or (3) the operations further include processing the set of measurement values to generate a set of processed values in a standardized color space based on the set of measurement values. The operations further include generating output data for the at least one ink representing an inking level and a tone value increase error based on the set of measurement/processed values and the set of input values. The operations further include generating a second target image by modifying the first target image based on the output data representing the inking level and the tone value increase error. The operations further include identifying one or more print defects in the printed image by comparing the acquired image to the second target image.

In any of the embodiments discussed above, the standard spectral response may be an International Organization for Standardization (ISO) standard.

In any of the embodiments discussed above, the standardized color space may be one of an International Commission on Illumination (CIE) XYZ color space, a CIELAB color space, or a DIN99 color space.

In any of the embodiments discussed above, the sensor may be configured to generate the measurement values based on data measured using six wavelength channels.

In any of the embodiments above, the tone value increase and/or tone value increase error may be determined without using a color bar including reference patches for the at least one ink.

In any of the embodiments discussed above, a color error due to the tone value increase and/or tone value increase error may be determined, and one or more parameters configured to control operation of a printing press that printed the printed image on the substrate may be modified based on the color error.

In any of the embodiments discussed above: (1) a first target image corresponding to the printed image may be collected, (2) an acquired image may be collected from the printed image, (3) the acquired image and/or target image may be modified based on the tone value increase and/or tone value increase error, and (4) one or more print defects in the printed image may be identified by comparing the original/modified acquired image to the original/modified target image.

In any of the embodiments discussed above, at least one of the measured color values used to determine the tone value increase error may correspond to a location on the printed image outside of a color bar including reference patches for the at least one ink.

In any of the embodiments discussed above, output data and/or error data may be generated using a printed image in combination with a color bar, without using a color bar, or using a reduced/modified color bar. For example, in some embodiments, the systems and/or methods may be designed to determine the tone value increase and/or tone value increase error using a color bar and without a color bar.

In any of the embodiments discussed above, a set of target color values for each of the one or more locations may be determined based on the set of input tone values, and the tone value increase and/or tone value increase error may be determined by comparing the set of target color values to the set of measured color values. In some embodiments, the set of target color values may be determined by receiving input data representative of a target tone value increase.

In any of the embodiments discussed above, the set of one or more locations on the printed image may be determined by receiving input data representative of the locations.

In any of the embodiments discussed above, the output data (e.g., tone value increase and/or tone value increase error) may be used to detect errors and/or modify print parameters (e.g., for color control and/or defect detection) either pre-press (e.g., prior to a print run in which a plurality of printed images are printed on the substrate) or during print (e.g., while a plurality of printed images are being printed on the substrate).

In any of the embodiments discussed above, the tone value increase and/or tone value increase error may be determined during a first print run in which a printing press generates a first plurality of printed images on the substrate, and the tone value increase and/or tone value increase error may be provided to a pre-press module configured to modify one or more parameters of the printing press based on the tone value increase and/or tone value increase error prior to a second print run in which the printing press generates a second plurality of printed images on the substrate.

In any of the embodiments discussed above, one or more parameters of the printing press may be modified based on the tone value increase and/or tone value increase error during a print run in which the printing press generates a plurality of printed images on the substrate.

In any of the embodiments discussed above, data may be generated using a single sensor or multiple sensors.

Various embodiments discussed above may be used to determine separate errors in inking level, or ink density, and errors associated with TVI (e.g., difference between the target relative area and an actual relative area of the ink within the predetermined area) and/or TVI error (e.g., difference of the expected difference and the actual difference between the target relative area and the actual relative area of the ink within the predetermined area). In some such embodiments, parameters (e.g., press parameters) may be adjusted to adjust for and/or otherwise control ink density errors and errors associated with TVI/TVI error either independently or together. In various embodiments, the parameters may be controlled manually (e.g., based on error data provided to a press operator via a display), using a closed-loop or automatic control (e.g., based on an algorithm or other control configured to modify the parameters based on the error values), or a combination of both manual and automatic control.

In various embodiments, the systems and/or methods described above may be incorporated within a printing press including one or more ink control devices configured to control deposition of at least one ink on a substrate to generate a printed image and one or more processing circuits configured to determine TVI and/or TVI Error. The one or more processing circuits may be configured to control the ink control devices based at least in part on the TVI and/or TVI Error.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A system for analyzing reproduction of a printed image on a substrate printed by a printing press using at least one ink, comprising:
   at least one processing circuit configured to:
      receive a set of measured color values corresponding to a set of locations on the printed image from a sensor;
      determine an apparent tone value increase using the set of measured color values and a set of input tone values, the apparent tone value increase indicating an actual increase in tone values; and
      determine, without requiring measured color values from a predefined printed color patch printed with the printed image on the substrate, a tone value increase error based at least on the apparent tone value increase, the tone value increase error indicating a difference between an expected increase in the tone values and the actual increase in the tone values, the actual increase in the tone values reflected by the apparent tone value increase.

2. The system of claim 1, wherein the sensor is configured to generate the set of measured color values to be compliant with a standard spectral response.

3. The system of claim 1, wherein the sensor is configured to generate the set of measured color values based on data measured using at least four wavelength channels.

4. The system of claim 1, wherein the predefined printed color patch is a particular color patch of a color bar comprising one or more reference patches for the at least one ink.

5. The system of claim 1, wherein the at least one processing circuit is further configured to:
   determine a color error due to the tone value increase error; and
   modify one or more parameters configured to control operation of the printing press based on the color error.

6. The system of claim 1, wherein the at least one processing circuit is further configured to:
   determine a target image corresponding to the printed image;
   collect an acquired image from the printed image on the substrate;
   modify the acquired image or the target image based on the tone value increase error; and
   identify one or more print defects in the printed image using the acquired image or the target image.

7. The system of claim 1, wherein at least one of the set of measured color values used to determine the tone value increase error corresponds to a location on the printed image outside of a color bar comprising reference patches for the at least one ink.

8. The system of claim 1, wherein the at least one processing circuit is configured to determine a set of target color values for each location of the set of locations based on the set of input tone values and determine the tone value increase error by comparing the set of target color values to the set of measured color values, wherein the at least one processing circuit is configured to determine the set of target color values by receiving input data representative of a target tone value increase.

9. The system of claim 1, wherein the tone value increase error is determined during a first print run in which the printing press generates a first plurality of printed images on the substrate, and wherein the at least one processing circuit is further configured to provide the tone value increase error to pre-press circuitry configured to modify one or more parameters of the printing press based on the tone value increase error prior to a second print run in which the printing press generates a second plurality of printed images on the substrate.

10. The system of claim 1, wherein the at least one processing circuit is configured to modify one or more parameters of the printing press based on the tone value increase error during a print run in which the printing press generates a plurality of printed images on the substrate.

11. The system of claim 1, wherein the at least one processing circuit is configured to determine the apparent tone value increase using the set of measured color values and the set of input tone values by:
  determining a set of apparent tone values using the set of measured color values; and
  determine the apparent tone value increase based on the set of apparent tone values and the set of input tone values.

12. The system of claim 11, wherein the expected increase in the tone values is reflected by a target tone value increase;
  wherein the at least one processing circuit is configured to determine the tone value increase error based on at least the apparent tone value increase and the target tone value increase;
  wherein the at least one processing circuit is configured to:
    determine the set of input tone values for the at least one ink, each input tone value in the set of input tone values comprising an ink richness value within a range between no ink and a predefined target richness value; and
    determine, for the at least one ink, the target tone value increase comprising a target difference between the set of input tone values and the set of apparent tone values determined using measurements from the printed image.

13. The system of claim 12, wherein the at least one processing circuit is configured to process the set of measured color values to generate the set of apparent tone values in a standardized color space.

14. The system of claim 13, wherein the standardized color space is one of an International Commission on Illumination (CIE) XYZ color space, a CIELAB color space, or a DIN99 color space.

15. A method for analyzing reproduction of a printed image on a substrate printed by a printing press using at least one ink, comprising:
  receiving, by a processing circuit, a set of measured color values corresponding to a set of locations on the printed image from a sensor;
  determining, by the processing circuit, an apparent tone value increase using the set of measured color values and a set of input tone values, the apparent tone value increase indicating an actual increase in tone values; and
  determining, by the processing circuit, without requiring measured color values from a predefined printed color patch printed with the printed image on the substrate, a tone value increase error based at least on the apparent tone value increase, the tone value increase error indicating a difference between an expected increase in the tone values and the actual increase in the tone values, the actual increase in the tone values reflected by the apparent tone value increase.

16. The method of claim 15, wherein determining, by the processing circuit, the apparent tone value increase using the set of measured color values and the set of input tone values comprises:
  determining a set of apparent tone values using the set of measured color values; and
  determine the apparent tone value increase based on the set of apparent tone values and the set of input tone values.

17. The method of claim 16, wherein the expected increase in the tone values is reflected by a target tone value increase;
  wherein determining, by the processing circuit, the tone value increase error is based on at least the apparent tone value increase and the target tone value increase;
  wherein the method further comprises:
    determining, by the processing circuit, the set of input tone values for the at least one ink, each input tone value in the set of input tone values comprising an ink richness value within a range between no ink and a predefined target richness value; and
    determining, by the processing circuit, for the at least one ink, the target tone value increase comprising a target difference between the set of input tone values and the set of apparent tone values determined using measurements from the printed image.

18. The method of claim 17, wherein the method further comprises processing, by the processing circuit, the set of measured color values to generate the set of apparent tone values in a standardized color space.

19. A printing system for printing an image on a substrate printed and analyzing reproduction of the image, comprising:
  one or more printing devices configured to print the image on the substrate;
  a sensor device configured to measure color values corresponding to a set of locations on the image;
  at least one processing circuit configured to:
    receive a set of measured color values corresponding to the set of locations on the image from a sensor; and
    determine, without requiring measured color values from a predefined printed color patch printed with the image on the substrate, a tone value increase error based at least on the set of measured color values, the tone value increase error indicating a difference between an expected increase in tone values and actual increase in the tone values.

20. The printing system of claim 19, wherein the at least one processing circuit is configured to determine an apparent tone value increase using the set of measured color values and a set of input tone values, the apparent tone value increase indicating the actual increase in tone values;
  wherein the at least one processing circuit is configured to determine the tone value increase error based on the apparent tone value increase.

* * * * *